US011963001B2

(12) United States Patent
Hoyer

(10) Patent No.: US 11,963,001 B2
(45) Date of Patent: *Apr. 16, 2024

(54) PERIMETER OFFLINE SECURE EXCHANGE OF ACCESS CONTROL TOKEN

(71) Applicant: ASSA ABLOY AB, Stockholm (SE)

(72) Inventor: Philip Hoyer, Richmond (GB)

(73) Assignee: ASSA ABLOY AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/805,810

(22) Filed: Jun. 7, 2022

(65) Prior Publication Data
US 2022/0303766 A1  Sep. 22, 2022

Related U.S. Application Data

(63) Continuation of application No. 16/631,367, filed as application No. PCT/IB2018/000904 on Jul. 18, 2018, now Pat. No. 11,388,591.

(60) Provisional application No. 62/643,469, filed on Mar. 15, 2018, provisional application No. 62/534,056, filed on Jul. 18, 2017.

(51) Int. Cl.
H04L 29/06 (2006.01)
G06F 21/62 (2013.01)
G06N 20/00 (2019.01)
G07C 9/22 (2020.01)
(Continued)

(52) U.S. Cl.
CPC .... *H04W 12/0431* (2021.01); *G06F 21/6209* (2013.01); *G06N 20/00* (2019.01); *G07C 9/22* (2020.01); *H04L 9/3234* (2013.01); *H04L 9/3247* (2013.01)

(58) Field of Classification Search
CPC .......... H04W 12/0431; G06F 21/6209; G06N 20/00; G07C 9/22; G07C 9/27; G07C 9/21; H04L 9/3234; H04L 9/3247
See application file for complete search history.

(56) References Cited

U.S. PATENT DOCUMENTS 7,376,839 B2  5/2008  Carta et al.
8,319,606 B2  11/2012  Mcgeachie
(Continued)

FOREIGN PATENT DOCUMENTS

EP  1837792 A1  9/2007
JP  2004070542 A  3/2004
(Continued)

OTHER PUBLICATIONS

"U.S. Appl. No. 16/631,367, Notice of Allowance dated Mar. 8, 2022", 17 pgs.
(Continued)

*Primary Examiner* — Mahfuzur Rahman
(74) *Attorney, Agent, or Firm* — Schwegman Lundberg & Woessner, P.A.

(57) ABSTRACT

A method, access control system, and readers for use in an access control system are described. One example of the disclosed method providers the ability to securely augment an existing physical access control system that relies on access control tokens (e.g., credentials) with a secure mobile-based solution allowing the secure local offline exchange of a new access control token for another that can be used with the existing installed access control system.

20 Claims, 11 Drawing Sheets

(51) Int. Cl.
*H04L 9/32* (2006.01)
*H04W 12/0431* (2021.01)

(56) References Cited

U.S. PATENT DOCUMENTS

| | | | |
|---|---|---|---|
| 8,468,244 B2* | 6/2013 | Redlich | G06Q 50/18 |
| | | | 715/255 |
| 8,538,332 B2* | 9/2013 | Huomo | G06Q 20/3278 |
| | | | 370/401 |
| 8,543,684 B2 | 9/2013 | Hulusi et al. | |
| 8,602,293 B2 | 12/2013 | Hammad | |
| 8,627,075 B2* | 1/2014 | Ikeda | H04W 12/50 |
| | | | 713/168 |
| 8,966,268 B2 | 2/2015 | Marien | |
| 9,124,433 B2 | 9/2015 | Marien et al. | |
| 9,286,481 B2 | 3/2016 | Ghosh | |
| 9,306,750 B2 | 4/2016 | Syngkon et al. | |
| 9,312,926 B2* | 4/2016 | Neafsey | G06F 21/6236 |
| 9,769,164 B2 | 9/2017 | Mcgeachie | |
| 10,026,108 B2* | 7/2018 | Jackson | H04L 67/75 |
| 10,062,224 B2 | 8/2018 | Cojocaru et al. | |
| 10,089,801 B1 | 10/2018 | Musabeyoglu et al. | |
| 10,129,248 B2 | 11/2018 | Lovelock et al. | |
| 10,403,064 B2 | 9/2019 | Hulusi et al. | |
| 10,958,435 B2 | 3/2021 | Spanier et al. | |
| 11,388,591 B2 | 7/2022 | Hoyer | |
| 2017/0339112 A1 | 11/2017 | Hoyer et al. | |
| 2020/0145820 A1 | 5/2020 | Hoyer | |

FOREIGN PATENT DOCUMENTS

| | | |
|---|---|---|
| WO | WO-2014140810 A1 | 9/2014 |
| WO | WO-2019016599 A1 | 1/2019 |

OTHER PUBLICATIONS

"U.S. Appl. No. 16/631,367, Preliminary Amendment filed Mar. 31, 2020", 7 pgs.

"European Application Serial No. 18765158.3, Response to Communication pursuant to Rules 161(1) and 162 EPC response filed Aug. 26, 2020", 19 pgs.

"European Application Serial No. 20212079.6, Extended European Search Report dated Apr. 22, 2021", 12 pgs.

"European Application Serial No. 20212079.6, Response filed Nov. 19, 2021 to Extended European Search Report dated Apr. 22, 2021", 18 pgs.

"International Application Serial No. PCT/IB2018/000904, International Search Report dated Dec. 4, 2018", 4 pgs.

"International Application Serial No. PCT/IB2018/000904, Written Opinion dated Dec. 4, 2018", 11 pgs.

"European Application Serial No. 18765158.3, Communication Pursuant to Article 94(3) EPC dated Jul. 20, 2022", 7 pgs.

"European Application Serial No. 18765158.3, Response Filed Nov. 18, 2022 to Communication Pursuant to Article 94(3) EPC dated Jul. 20, 2022", 10 pgs.

"European Application Serial No. 20212079.6, Communication Pursuant to Article 94(3) EPC dated Jul. 5, 2023", 7 pgs.

* cited by examiner

PERIMETER OFFLINE SECURE EXCHANGE OF ACCESS CONTROL TOKEN

CROSS-REFERENCE TO RELATED APPLICATIONS

This is a continuation application of U.S. patent application Ser. No. 16/631,367, titled "Perimeter Offline Secure Exchange of Access Control Token," filed Jan. 15, 2020, which is a National Stage Entry application of International PCT Patent Application No. PCT/IB2018/000904, titled "Perimeter Offline Secure Exchange of Access Control Token," filed on Jul. 18, 2018, which claims the benefit of U.S. Provisional Patent Application No. 62/534,056, filed on Jul. 18, 2017, and U.S. Provisional Patent Application No. 62/643,469, filed on Mar. 15, 2018, each of which is hereby incorporated herein by reference in its entirety.

FIELD OF THE DISCLOSURE

Embodiments of the present disclosure relate to physical access control systems and methods for operating the same.

BACKGROUND

In stadium or sports arena access an existing access control system is installed and accepts credentials or access control tokens of a specific format. Often times, the credentials or access control tokens are transmittable via electronic or optical methods. One example of such an access token could be a barcode or 2D barcode (e.g., a QR code).

There are security drawbacks with using barcodes or 2D barcodes, especially if the access token transportation medium is a mobile device. For example, it is easy to take a screen shot of the barcode to send it to friends (credential duplication). Even some early Radio Frequency Identification (RFID) technologies have security shortcomings that might allow the access control token to be copied or cloned. This effectively compromises the overall security of the system.

SUMMARY

It is with respect to the above that embodiments of the present disclosure were contemplated. In particular, embodiments of the present disclosure contemplate a method that, in certain scenarios, allows a significant improvement in the overall system security without the installation of a new permanent access control system at the venue (e.g., a stadium).

In some aspects of the present disclosure, a method is provided. In one aspect, the method comprises:
  receiving a credential at a mobile communication device, the received credential including a data object that comprises a mobile access control token (MACT) and an access control token (ACT);
  storing the credential in a secured memory location of the mobile communication device;
  determining that the mobile communication device is within communication proximity of a first reader;
  providing one or both of the MACT and ACT to the first reader thereby enabling the first reader to verify one or both of the MACT and ACT as valid;
  receiving a response back at the mobile communication device from the first reader, wherein the response received at the mobile communication device provides an indication of the first reader's validity assessment for the MACT and/or ACT; and
  enabling the mobile communication device to present the ACT or another credential derived from the ACT to a second reader, thereby enabling the second reader to assess a validity of the ACT or the credential derived from the ACT.

In some aspects of the present disclosure one or both of the MACT and the ACT are provided to the first reader via a secured communication channel and wherein an access control decision made by the second reader is hierarchical or otherwise dependent upon the validity of the MACT as determined by the first reader in addition to being dependent upon the validity of the ACT or the credential derived from the ACT as determined by the second reader.

In some aspects of the present disclosure the secured communication channel is encrypted and the secured communication channel utilizes a wireless communication protocol to carry information between the mobile communication device and the first reader. In some particular embodiments, the wireless communication protocol comprises at least one of an RFID communication protocol, NFC, Bluetooth, BLE, WiFi, and a proximity-based communication protocol.

In some aspects of the present disclosure the MACT and ACT are provided to the first reader via the data object, wherein the MACT is unencrypted, wherein the ACT is encrypted, wherein the first reader verifies the MACT, and wherein the first reader decrypts the ACT to obtain a decrypted ACT. The mobile communication device may be configured to receive the decrypted ACT from the first reader and present the decrypted ACT or a credential derived from the decrypted ACT to the second reader.

In some aspects of the present disclosure the mobile communication device stores an encrypted instance of the ACT in the secured memory location, where only the MACT is provided to the first reader, and where the first reader provides a key back to the mobile communication device in the response. The method may further include the mobile communication device utilizing the key received in the response to decrypt the encrypted instance of the ACT from the data object stored in the secured memory location. Furthermore, the mobile communication device may present the decrypted ACT or a credential derived from the decrypted ACT to the second reader.

In some aspects of the present disclosure the MACT and ACT are provided to the first reader via the data object, where both the MACT and ACT are encrypted in the data object, where the first reader decrypts the data object to obtain the MACT and ACT, where the first reader verifies the MACT before returning the (decrypted) ACT to the mobile communication device, and where the response received at the mobile communication device comprises the ACT.

In some aspects of the present disclosure the response is provided to the mobile communication device via a secure communication channel.

In some aspects of the present disclosure the mobile communication device presents the ACT or a credential derived from the ACT to the second reader in a computer-readable format. In a non-limiting example, the computer-readable format comprises at least one of a barcode, a two-dimensional code, an image, or another visible format. Further still, the mobile communication device may render the ACT or the credential derived from the ACT on a display screen of the mobile communication device.

In some aspects of the present disclosure the credential response is received at the mobile communication device using a mutually-authenticated secure channel protocol such as OPACITY protocol or an HID Seos protocol.

In some aspects of the present disclosure the credential is received via at least one of an IP packet and a Bluetooth payload.

In some aspects of the present disclosure the first reader is positioned at a first perimeter of a physical access control system, where the second reader is positioned at a second perimeter of the physical access control system, and where the second perimeter is contained within the first perimeter.

In some aspects, the method further includes requiring a mutual authentication between the mobile communication device and the first reader prior to providing the MACT and/or ACT to the first reader.

In some aspects, the credential is delivered to the mobile communication device via a peer-to-peer proximity network.

In other embodiments, a system is provided that includes:
a first reader configured to establish a communication channel with a mobile communication device, wherein the first reader is positioned at a first position in a physical access control system, wherein the first reader is configured to receive one or both of a mobile access control token (MACT) and an access control token (ACT) from the mobile communication device via the communication channel, wherein the first reader is configured to assess a validity of the MACT, wherein the first reader is configured to provide the mobile communication device with a response that indicates the first reader's validity assessment for the MACT, and wherein the response provided by the first reader enables the mobile communication device to present the ACT or another credential derived from the ACT to other readers of the physical access control system; and
a second reader configured to assess a validity of the ACT or a credential derived from the ACT based on a presentation of the ACT or the credential derived from the ACT by the mobile communication device, wherein the second reader is positioned at a second position in the physical access control system that is internal with respect to the first position.

In some aspects of the present disclosure the communication channel comprises a wireless communication channel.

In some aspects of the present disclosure the second reader utilizes machine vision to read the ACT or the credential derived from the ACT.

In some aspects of the present disclosure the ACT is not made available to the mobile communication device until the first reader determines that the MACT is valid.

In some aspects of the present disclosure the first reader further includes a processor that decrypts the ACT to obtain a decrypted ACT and the decrypted ACT is provided to the mobile communication device in the response.

In some aspects of the present disclosure the MACT and ACT are both encrypted in a secure data object.

In some aspects of the present disclosure the system further includes a key issuance system configured to generate and provide the MACT and optionally the ACT to the mobile communication device via a (signed, encrypted) data object, wherein the key issuance system is further capable of issuing keys to required readers that will securely read, decrypt and verify said data object.

In some aspects of the present disclosure the second reader utilizes a different communication protocol than the first reader to communicate with the mobile communication device.

In some aspects of the present disclosure the first reader is configured to provide a key to the mobile communication device that enables the mobile communication device to decrypt the ACT. The mobile communication device may use the key or a decryption key derived from the key to decrypt the ACT and the first reader may only provide the key to the mobile communication device in response to determining that the MACT and/or ACT are valid.

In other embodiments, a reader for use in a physical access control system is provided that includes:
an interface that enables wireless communications with a mobile communication device and that enables the reader to receive a mobile access control token (MACT) from the mobile communication device;
a processor; and
memory having processor-executable instructions stored thereon, the instructions including:
instructions that assess a validity of the MACT;
instructions that generate a response to the mobile communication device based on the validity assessment of the MACT, wherein the response to the mobile communication device includes an access control token (ACT) usable by the mobile communication device with other readers in the physical access control system or in a separate access control system, a credential derived from the ACT, or a key that enables the mobile communication device to decrypt an ACT stored in memory of the mobile communication device; and
instructions that cause the response to be transmitted back to the mobile communication device via the interface.

In other embodiments, a method is provided that includes:
receiving a credential at a mobile communication device, the received credential including a data object that comprises and an encrypted access control token (ENC_ACT);
storing the credential in a secured memory location of the mobile communication device;
determining that the mobile communication device is within communication proximity of a first wireless communication device;
receiving a communication message back at the mobile communication device from the first wireless communication device, wherein the communication message received at the mobile communication device provides a decryption key for the ENC_MACACT; and
enabling the mobile communication device to present the ACT or another credential derived from the ACT to a second wireless communication device, thereby enabling the second wireless communication device to assess a validity of the ACT or the credential derived from the ACT.

In some aspects of the present disclosure the communication message received at the mobile communication device allows the mobile communication device in conjunction with a MACT to determine that the first wireless communication device is a genuine mobile communication device reader and only after such determination allow the decryption of the ENC_ACT. The determination that the first wireless communication device is a genuine mobile communication device reader may include using a signed nonce or a One-Time Password with counter where the MACT contains corresponding cryptographic material produced by the signed nonce or the One-Time Password.

In some aspects of the present disclosure the mobile communication device stores an encrypted instance of the ACT in the secured memory location, where the first wireless communication device provides a key back to the mobile communication device based on proximity of the mobile device or by the fact that the proximity communication protocol is capable of being stablished. The method may then further include the mobile communication device utilizing the key received thereby to decrypt the encrypted instance of the ACT from the data object stored in the secured memory location.

In some aspects of the present disclosure an additional key mK is provisioned to the mobile communication device and a communication message received at the mobile communication device from the first wireless communication device allows the mobile communication device in conjunction with mK or using mK in a cryptographic operation to compute the decryption key for the ENCJVIAC. As an example, the cryptographic operation may include an unwrap operation and a decryption operation.

In some aspects of the present disclosure the first wireless communication device includes a secure beacon and the second wireless communication device includes a reader.

The term "computer-readable medium," as used herein, may refer to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, a "token" may be any data, set of data, structure of data, encryption scheme, key, hardware/physical device used to carry data, and/or transmission protocol used by a particular device (e.g., a credential device, mobile communication device, key fob, etc.) to authenticate and/or verify its authenticity with a reader, and/or interrogator. The term "token" should not be construed so as to limit embodiments to a particular device or combination of devices, but rather can include any device, combination of devices, and/or data stored on such device(s).

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

When each one of A, B, and C in the above expressions refers to an element, such as X, Y, and Z, or class of elements, such as Xi-Xn, Yi-Ym, and Zi-$Z_O$, the phrase is intended to refer to a single element selected from X, Y, and Z, a combination of elements selected from the same class (e.g., Xi and $X_2$) as well as a combination of elements selected from two or more classes (e.g., Yi and $Z_O$).

The term "a" or "an" entity may refer to one or more of that entity. As such, the terms "a" (or "an"), "one or more" and "at least one" can be used interchangeably herein.

It is also to be noted that the terms "comprising", "including", and "having" can be used interchangeably.

The terms "determine," "calculate," and "compute," and variations thereof, as used herein, may be used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein.

Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The present disclosure is described in conjunction with the appended figures, which are not necessarily drawn to scale.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1A:
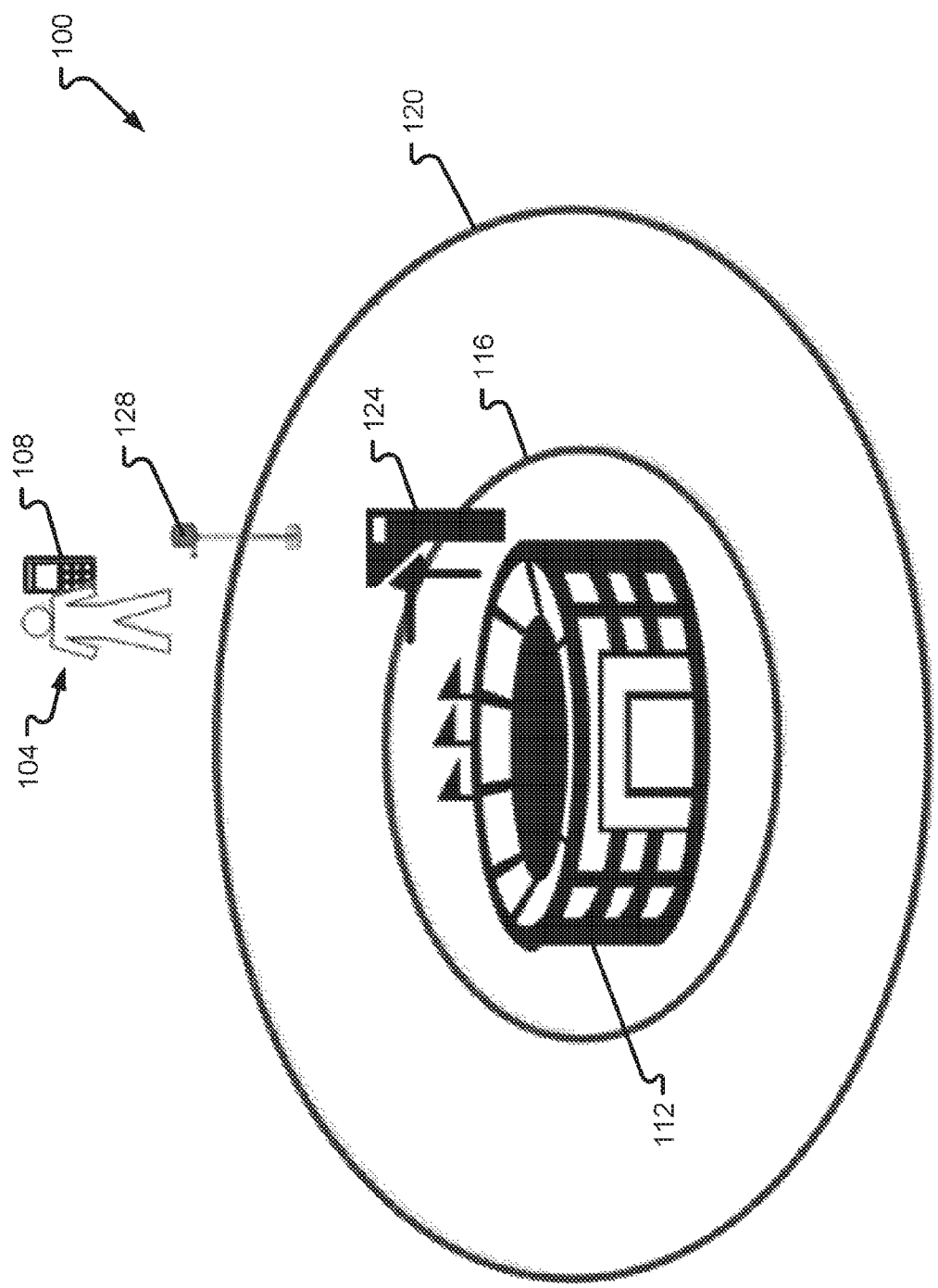
FIG. 1A illustrates a first configuration of a physical access control system in accordance with at least some embodiments of the present disclosure.
Figure 1B:
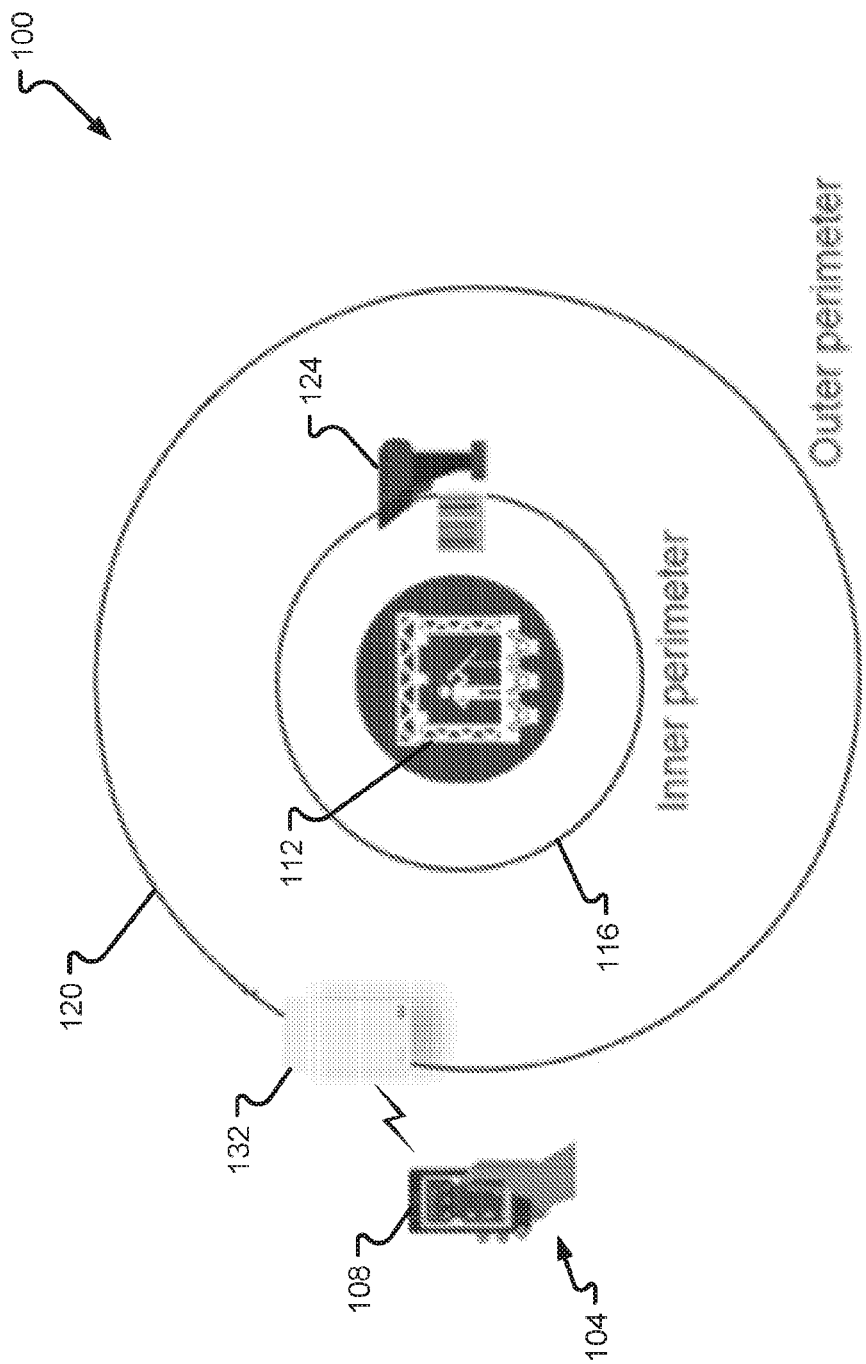
FIG. 1B illustrates a second configuration of a physical access control system in accordance with at least some embodiments of the present disclosure.

With reference to FIGS. 1A and 1B, various configurations of an illustrative physical access control system 100 will be described in accordance with at least some embodiments of the present disclosure. While embodiments of the physical access control system 100 are generally described in connection with the protection of a physical venue, such as a stadium or other area for gathering a large number of people, it should be appreciated that embodiments of the present disclosure are not so limited. Indeed, concepts depicted and described herein can be used to protect logical assets (e.g., computers, communication networks, computing networks, financial accounts, etc.) and physical assets other than stadiums (e.g., buildings, rooms within buildings, amusement parks, rides within amusement parks, hotels, rooms within hotels, cruise ships, rooms within cruise ships, casinos, attractions within casinos, hospitals, rooms within hospitals, public transit systems and assets, schools, universities, etc.).

The first illustrative configuration of the system 100 shown in FIG. 1A depicts the system as having at least one user 104 that is carrying a mobile communication device 108. The user 104 is shown to desire admission to a physical asset 112 protected by two security perimeters or areas that include an inner perimeter 116 and an outer perimeter 120. The inner perimeter 116 is shown to have one or more first readers 124 associated therewith while the outer perimeter 120 is shown to have one or more second readers 128 associated therewith. As will be discussed in further detail herein, the user 104 may utilize their mobile communication device 108 to interact with a second reader 128 at the outer perimeter 120. Thereafter, the user 104 may utilize their mobile communication device 108 to interact with a first reader 124 at the inner perimeter 116. In some embodiments, the one or more first readers 124 are used to protect/limit/control access to one or more assets 112 maintained within the inner perimeter 116. As an example, the assets 112 protected within the inner perimeter 116 by the one or more first readers 124 may correspond to one or more physical assets and/or one or more logical assets. It should be appreciated that unless the user 104 presents the one or more first readers 124 with a valid mobile communication device 108 having appropriate token(s) stored thereon, the user 104 may be denied access to the asset(s) 112. In some embodiments, access to the asset(s) 112 may be automatically limited by the one or more first readers 124. In some embodiments, one or more security personnel may be stationed near the one or more first readers 124 to enforce access control decisions made or verified by the first reader(s) 124.

As the name suggests, the inner perimeter 116 is shown to be contained within or inside the outer perimeter 120. In accordance with embodiments, the inner perimeter 116 may include one or more physical obstacles (e.g., walls, fences, etc.) that define the boundary of the inner perimeter 116. Alternatively or additionally, the inner perimeter 116 may correspond to an imaginary boundary that encloses, partially or completely, the asset(s) 112. One or more portals (e.g., doors, gates, turnstile, etc.) may be provided around the inner perimeter 116 and the portals may be equipped with a first reader 124 to control access through the portals to the asset(s) 112. As will be discussed in further detail herein, access through the portals may be conditional upon the first reader 124 receiving one or more valid tokens from the mobile communication device 108. In some embodiments, the mobile communication device 108 may be capable of providing such valid token(s) to the first reader 124 only after the mobile communication device 108 has exchanged information with at least one second reader 128 (or some other device positioned at the outer perimeter 120). Said another way, the mobile communication device 108 may need to first obtain information from the second reader(s) 128 to generate a valid access control token for the first reader(s) 124.

The outer perimeter 120 is shown to be positioned outside and around the inner perimeter 116. It should be appreciated, however, that in some embodiments the location of the outer perimeter 120 may be aligned with the location of the inner perimeter 116 (e.g., at certain locations). For instance, it may be possible to position a second reader 128 near (e.g., within five feet or less) a first reader 124. In some embodiments, the second reader 128 and first reader 124 may be co-located next to one another (e.g., immediately adjacent to one another or within a common housing) to provide that the token unwrapping/activation/decryption occurs just prior to usage of the token with the reader 124. The user 104 may still be required to present their mobile communication device 108 to the second reader 128 before being able to generate a valid token for the first reader 124; however, the user 104 may not be required to travel a long distance between the readers 124, 128. In other embodiments, the second reader 128 may be positioned a relatively significant distance away from the first reader 124, thereby requiring the user 104 to travel the distance before reaching the first reader 124.

The outer perimeter 120 may or may not include one or more physical obstacles (e.g., walls, fences, etc.) to define the boundary of the outer perimeter 120. In other words, the second readers 128 may simply be positioned at various locations outside the inner perimeter 116, for example, near portals within the outer perimeter 120 or a locations outside the outer perimeter such as parking lots, transportation terminals, and/or walkway ways. However, in other embodiments, the outer perimeter 120 may include one or more physical obstacles with portals provided therein and entrance through such portals may be conditioned upon the presentation of a valid mobile communication device 108. In some embodiments, the second reader(s) 128 may accept different tokens or data structures as compared to the first reader(s) 124. As a non-limiting example, the first reader(s) 124 may be configured to accept/read tokens in a first format (e.g., as optical codes, barcodes, QR codes, etc.) whereas the second reader(s) 128 may be configured to accept/read tokens in a second format (e.g., as data structure(s) transmitted wirelessly via RF, Bluetooth, NFC, etc.). Moreover, the second reader(s) 128 may be portable hardware reader devices that are temporarily placed at locations on or near the outer perimeter 120.

As will be described in further detail herein, the mobile communication device 108 may correspond to any type of device or collection of devices that can be carried by user 104. In some embodiments, the mobile communication device 108 may include a smartphone, a smart watch, a wearable device, a smart garment, a temporary wristband/bracelet, a key fob, a laptop, a computing tablet, or the like. The mobile communication device 108, as the name suggests, may include one or more components that enable the device 108 to communicate with other computing devices via a communication network (e.g., a cellular network, a WiFi network, a Zigbee network, etc.) or via a peer-to-peer connection (e.g., a Bluetooth connection, an NFC connection, via optical methods, etc.).

FIG. 1B depicts an alternative configuration of the system 100. The system 100 of FIG. 1B depicts a secure beacon 132 positioned at or near the outer perimeter 120 instead of a second reader 128. Additionally, the first reader 124 used to secure the inner perimeter 116 is shown as a barcode or QR code reader configured with machine vision.

The secure beacon 132 may correspond to any type of device or collection of devices that is capable of having data stored in internal memory. In some embodiments, data stored in memory of the secure beacon 132 is stored in an encrypted format and may be maintained in a secure memory device (e.g., a memory device that is protected with encryption and does not release data therefrom in the clear/unencrypted format). The secure beacon 132 may further include an internal processor/microprocessor and an interface that facilitates wireless communications with the mobile communication device 108. In some embodiments, the secure beacon 132 may be provided in any number of form factors, such as a portable credential/card, a portable key fob, a sticker, a button, another mobile communication device, etc. One non-limiting example of a secure beacon is described in U.S. Patent Application Publication No. 2017/0339112 to Hoyer et al., the entire contents of which are hereby incorporated herein by reference.

In some embodiments, the secure beacon 132 may perform the basic function of transmitting information in a secure fashion to the mobile communication device 108. In some embodiments, the secure beacon 132 transmits this information periodically without any request by the mobile communication device 108. In other embodiments, the secure beacon 132 waits until the presence of the mobile communication device 108 is detected within a predetermined proximity (e.g., within 50 feet or a wireless communication range of the secure beacon 132). Upon detecting a mobile communication device 108, the secure beacon 132 may pair with and then begin transmitting information in a secure fashion to the mobile communication device 108. In other embodiments, the information transmitted to the mobile communication device 108 may be transmitted in an unencrypted format.

In either configuration, the system 100 is shown to include an access control process with two perimeters. The outer perimeter 120 (which may be temporary or transient), is where normally-stander security checks can be performed such as bag checks, confirmation of possession of paper tickets, etc. The inner perimeter 116 may correspond to a boundary protected by an existing access control system (ACS1) where readers 124 are capable of verifying an access control token of a specific format (e.g., an optical code, barcode, QR code, etc.).

Figure 2A:
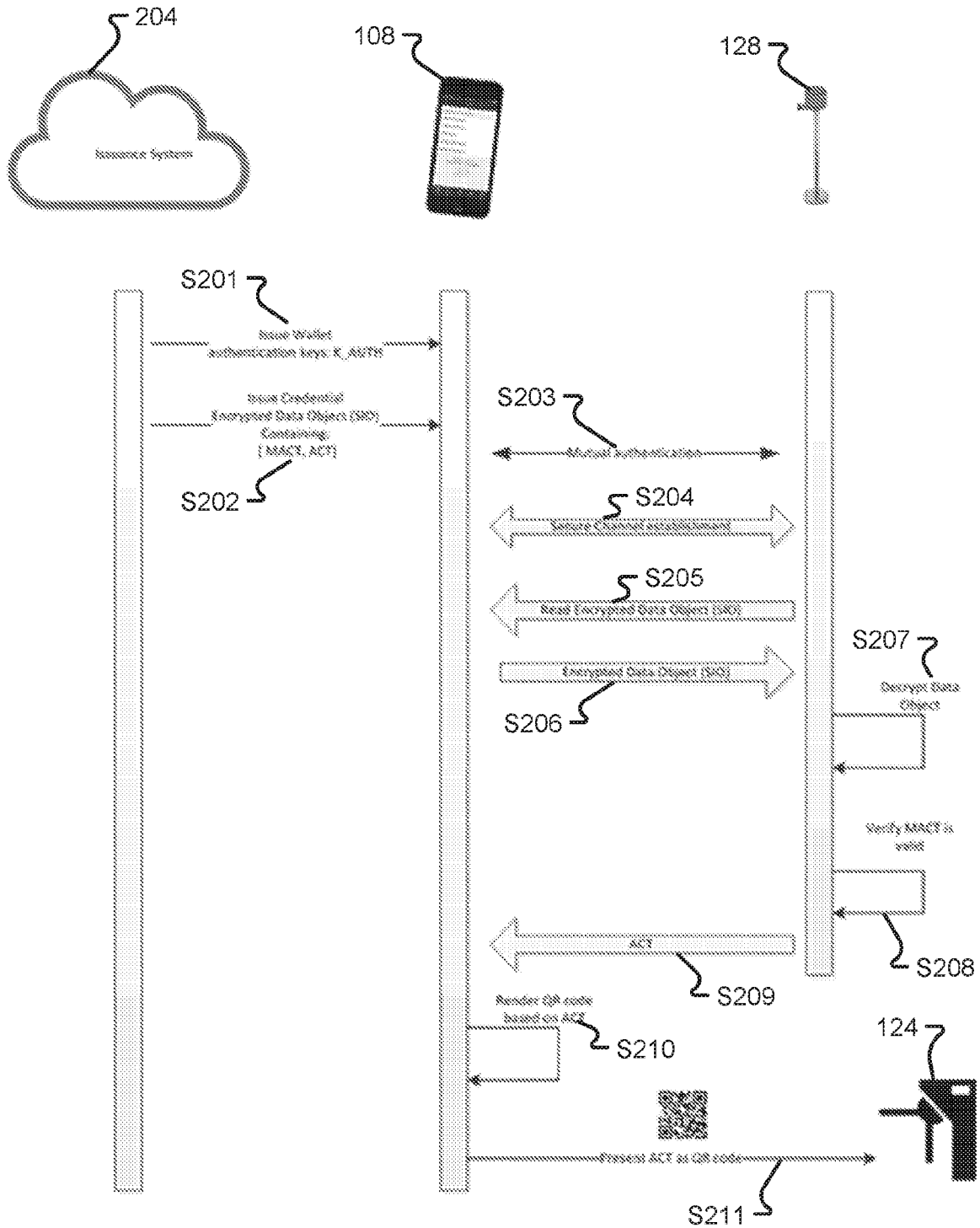
FIG. 2A is a flow diagram depicting a first method of obtaining and presenting a token to a physical access control reader in accordance with at least some embodiments of the present disclosure.
Figure 2B:
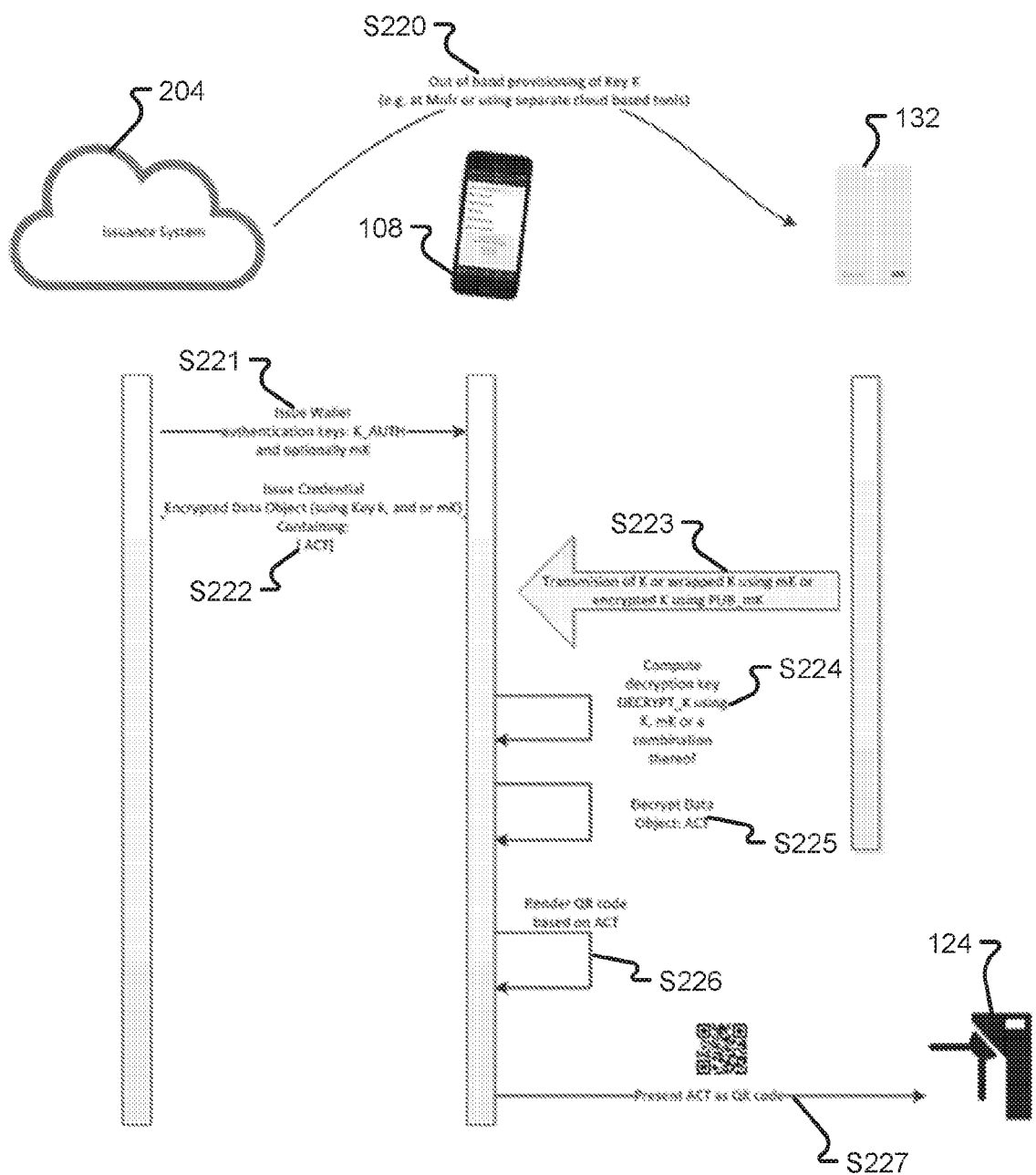
FIG. 2B is a flow diagram depicting a second method of obtaining and presenting a token to a physical access control reader in accordance with at least some embodiments of the present disclosure.

With reference now to FIGS. 2A and 2B, various methods for operating an access control system 100 will be described in accordance with at least some embodiments of the present disclosure. The methods depict various steps that may be taken in connection with delivering information to a mobile communication device 108 and then enabling that mobile communication device 108 to present one or more access tokens to a reader, such as the reader 124. The various methods depicted and described herein will detail a secure method that allows, among other things, secure issuance to the mobile communication device 108 of two (2) different access tokens. In some embodiments, at least one of the two access tokens can be verified by the existing access control system at the inner perimeter 116 (e.g., P_INNER: ACT_ACS1). Furthermore, in accordance with some embodiments, another new access control token (ACT2) can be verified by a portable or handheld reader (e.g., the second reader 128) at the outer perimeter 116 (which may also be referred to herein as P_OUTER).

In some embodiments, the secure method may further ensure that the first credential is decrypted by interaction with the reader/beacon at the outer perimeter 120, which facilitates decryption or unwrapping of the barcode/optical QR code in the data object such that the data therefrom can be presented to an existing system at the inner perimeter 116. This provides several benefits, including improved security of the overall legacy access control system in addition to upgrading the security without requiring a change to the infrastructure of the legacy access control system. Thus, in some embodiments, it is not possible to display or copy or access the first credential/token (e.g., ACT_ACS1) by any means until the second credential/token (e.g., ACT2) has been successfully verified by a verifier/reader 128 at the outer perimeter 120. The secure method may alternatively or additionally include a secure offline process at the outer perimeter 120 that allows to exchange the existing ACT2 and ACT_ACS1 to a valid access token for ACS1 VALID_ACT_ACS1.

In some embodiments, the secure method may include a secure issuance of one and possibly up to two encrypted access tokens to the mobile communication device 108. The access token that can be verified by the existing access control system at the inner perimeter P_INNER: ACT_ACS1 may be encrypted (ENC_ACT_ACS1) with a Key K or a combination of a key K and mobileKey mK. It should be appreciated that the mobileKey mK may be an optional key and is not necessarily required to execute the methods depicted and described herein.

According to some embodiments, it may not be possible to display or copy or access the ACT_ACS1 by any mechanism until the key K has been successfully received from a secure beacon 132 at the outer perimeter 120. A secure offline method (e.g., peer-to-peer) at the outer perimeter 120 may allow the mobile communication device 108 to receive the key K and hence on its own or in combination with the key stored on the mobile communication device (e.g., the mobileKey mK) facilitate decryption or access to the valid access token for ACS1 (e.g., VALID_ACT_ACS1).

With reference initially to FIG. 2A, a first method is shown to be initiated when a cloud issuance system 204 issues one or more mobile wallet authentication keys: K_AUTH to the mobile communication device 108 (step S201). In some embodiments, the cloud issuance system 204 may correspond to a cloud-based key issuance system that is configured to issue one or more secure mobile tokens/credentials. The issuance system 204 may be executed with one or more servers that are configured to communicate with the mobile communication device 108 via a communication network (e.g., a cellular network, WiFi network, etc.).

In some embodiments, the authentication keys K_AUTH may be provided to the mobile communication device 108 using one or more encrypted or secure communication pathways that traverse a communication network.

The issuance system 204 may also be in possession of encryption and/or Media Access Control (MAC) keys (e.g., K_ENC and K_MAC) that have been previously, out-of-band, provisioned to some or all of the readers 128. In a more specific embodiment, the issuance system 204 may be in possession of encryption and/or MAC keys (K_ENC and K_MAC) that were provisioned to a secure memory device (e.g., a SAM module or similar hardware-secured key storage device) contained within the reader 128. The cloud issuance system 204 may also be configured to store these keys in one or more hardware security modules or similar types of secure data facilities.

When a user 104 purchases or otherwise obtains permissions to access an asset 112, the issuance system 204 may issue a new mobile ticket credential (MTC) that contains: (1) a ticket mobile access control token (MACT) and (2) an encrypted control token (ACT) for the existing access control system (ACS1 or reader 124), which may be referred to as ENC_ACT encrypted with either K_ENC or with a key derived from K_ENC and the credential number of a key diversifier (step S202). In some embodiments, the cloud issuance system 204 may utilize an optional key diversifier. In some embodiments, the cloud issuance system 204 may encrypt both the MACT and the ACT together into a mobile credential that only a particular reader 128 has the appropriate keys to open (e.g., an HID SIO). The MTC may be issued to the mobile communication device 108 using a secured data channel and/or by providing an encrypted data object (e.g., an HID SIO) to the mobile communication device 108. In some embodiments, the encrypted data object may be delivered to the mobile communication device 108 via an appropriate communication channel established over a communication network. Even more specifically, the cloud issuance system 204 may have access or the ability to deliver the encrypted data object to the mobile wallet or secure data storage area of the mobile communication device 108.

Upon receiving the encrypted data object, the mobile communication device 108 may store the data object, or the components thereof, into a secure memory device contained within the mobile communication device 108. In a more specific, but non-limiting example, the mobile communication device 108 may have an application provided thereon that is able to access a secure area of memory without exposing the data object to other applications operated on the mobile communication device 108.

The method will then continue when the mobile communication device 108 is presented to the reader 128 (step S203). When the two devices 108, 128 are brought within a communication range of each other, a secure method of communication is established between the reader 128 and the mobile communication device 108 (or more specifically the secure application operating on the mobile communication device 108). This can be done over a proximity packet-based network such as Bluetooth smart, BLE, NFC, or other peer-to-peer networks without being connected to a wider communication network, such as a cellular network or the Internet. The communication is only established after a mutual authentication protocol has happened between the devices 108, 128 and will result in a session key establishment that allows a secure encrypted channel to be established between these devices for a temporary period of time. One embodiment might utilize the HID Seos technology over Bluetooth Smart (BLE) or the OPACITY protocol.

Once a secure communication channel is established (step S204), the method may continue with the mobile communication device 108 providing the MACT and/or the ENC_ACT to the reader 128. In some embodiments, the reader 128 may request or read out the MACT and/or ENC_ACT from the mobile communication device 108 by first providing the mobile communication device 108 with a read request in which the encrypted data object, or components thereof (e.g., MACT and/or ENC_ACT), are requested (step S205). The mobile communication device 108 may respond to a valid read request by providing the encrypted data object or components thereof (step S206). The reader 128 will then decrypt the data object ENC_ACT→ACT or components thereof (step S207). Thereafter, the reader 128 verifies whether or not the MACT is valid (step S208) and if it determines that the MACT is valid, the reader 128 passes back the decrypted ACT (e.g., the ACT) back to the mobile communication device 108 via the established secure channel session (step S209). In some embodiments, the decrypted ACT is provided back to the application that originally received and stored the data object from the cloud issuance system 204.

In another embodiment the reader 128 may only read out MACT and return over the secure channel to the mobile wallet the key to decrypt the ENC_ACT on the mobile communication device 108.

In another embodiment the reader 128 may receive both the MACT and the ACT encrypted together (e.g., within a single data object or SIO). The reader 128 would then decrypt the whole data object or SIO and verify the MACT before returning the ACT to the mobile communication device 108 over the established secure channel.

In still another embodiment, the mobile communication device 108 may be capable of generating an ephemeral keypair. The keypair may include a private key and a corresponding public key. The public key may be sent to the reader 128. The reader 128 can decrypt the ACT using one key and then re-encrypt the ACT with the public key from the ephemeral keypair. The re-encrypted ACT may then be transmitted back to the mobile communication device 108, which is capable of decrypting the re-encrypted ACT with its private key from the ephemeral keypair. This approach enables the reader 128 and mobile communication device 108 to exchange the ACT in an encrypted manner without requiring or in addition to an otherwise secure communication channel between the two devices.

After the mobile communication device 108 has received the ACT (or derived the ACT with information received from the reader 128), the method will continue with the mobile communication device 108 (or an application executed by the mobile communication device 108) rendering an access control token (e.g., a barcode, QR code, etc.) based on the ACT (step S210). This access control token (e.g., barcode, QR code, etc.) may then be presented to the other reader 124 at the inner perimeter 116 (step S21 1).

In some embodiments, the reader 124 may be configured to automatically consume or read the access control token generated by the mobile communication device 108. In some embodiments, the reader 124 may require the assistance of security personnel to point or direct the reader 124 toward the mobile communication device 108. In some embodiments, the access control token generated by the mobile communication device 108 may be transmitted wirelessly (e.g., via BLE, NFC, infrared, etc.) to the reader 124 to enable the reader 124 to assess whether or not the access control token is valid and, therefore, enables the user 104 to obtain access to the asset 112.

With reference now to FIG. 2B, an alternative method of operating the access control system 100 will be described in accordance with at least some embodiments of the present disclosure. In this particular method, the reader 128 may be replaced by a secure beacon 132 capable of storing a key K.

The method begins similar to the previous method with the cloud issuance system 204 being in possession of encryption and/or MAC keys (e.g., K_ENC) that have been previously provisioned to the secure beacon 132. In some embodiments, the secure beacon 132 is provisioned with the key K using an out-of-band provisioning (step S220). For instance, the secure beacon 132 may be provisioned at the facility where it is manufactured or may be provisioned using separate cloud-based provisioning tools that bypass the mobile communication device 108. In some embodiments, the mobile communication device 108 includes a secure access mobile (SAM) or similar secure data storage device for the storage of the key K and other sensitive information.

The method will continue with the mobile communication device 108 having an appropriate application provided thereon and then the cloud issuance system 204 issuing authentication keys (K_AUTH) and, optionally, a mobileKey mK (step S221). With the secure application in place on the mobile communication device 108, the cloud issuance system 204 may continue by issuing a credential to the mobile communication device 108 in the form of an encrypted data object (step S222). In some embodiments, the encrypted data objection may be issued using the key K and/or the mobileKey mK. As a non-limiting example, the data object may only contain an ACT that is encrypted/protected by the key K and/or mobileKey mK. Thus, the mobile communication device 108 is not able to utilize the data object until appropriate decryption keys are computed and used at the mobile communication device 108. Until then, the application running on the mobile communication device 108 may receive and securely store the encrypted ACT ENC_ACT and, optionally, the mobileKey mK.

The method may then continue with the mobile communication device 108 comes into a communication range or predetermined proximity (e.g., within 2 feet or less) of the secure beacon 132. Once the secure beacon 132 detects the presence of the mobile communication device 108 (e.g., via RF inductive coupling, NFC coupling, Bluetooth discovery, etc.) within its communication range, the secure beacon 132 may begin transmitting the key K or the key K wrapped using the mobileKey mK or the key K encrypted using a public version of the mobileKey mK (step S223).

The application running on the mobile communication device 108 may then compute the decryption key DK using K, mK, or a combination thereof (step S224). In some embodiments, the decryption key DK is then used by the mobile communication device 108 to decrypt the encrypted data object and obtain the ACT that was previously issued to the mobile communication device 108 by the cloud issuance system 204 (step S225).

The mobile communication device 108 may then render an appropriate QR code, barcode, etc. based on the decrypted ACT (step S226). Thereafter, the mobile communication device 108 may present the code or the ACT to the reader 124 for consumption thereof (step S227).

Figure 3A:
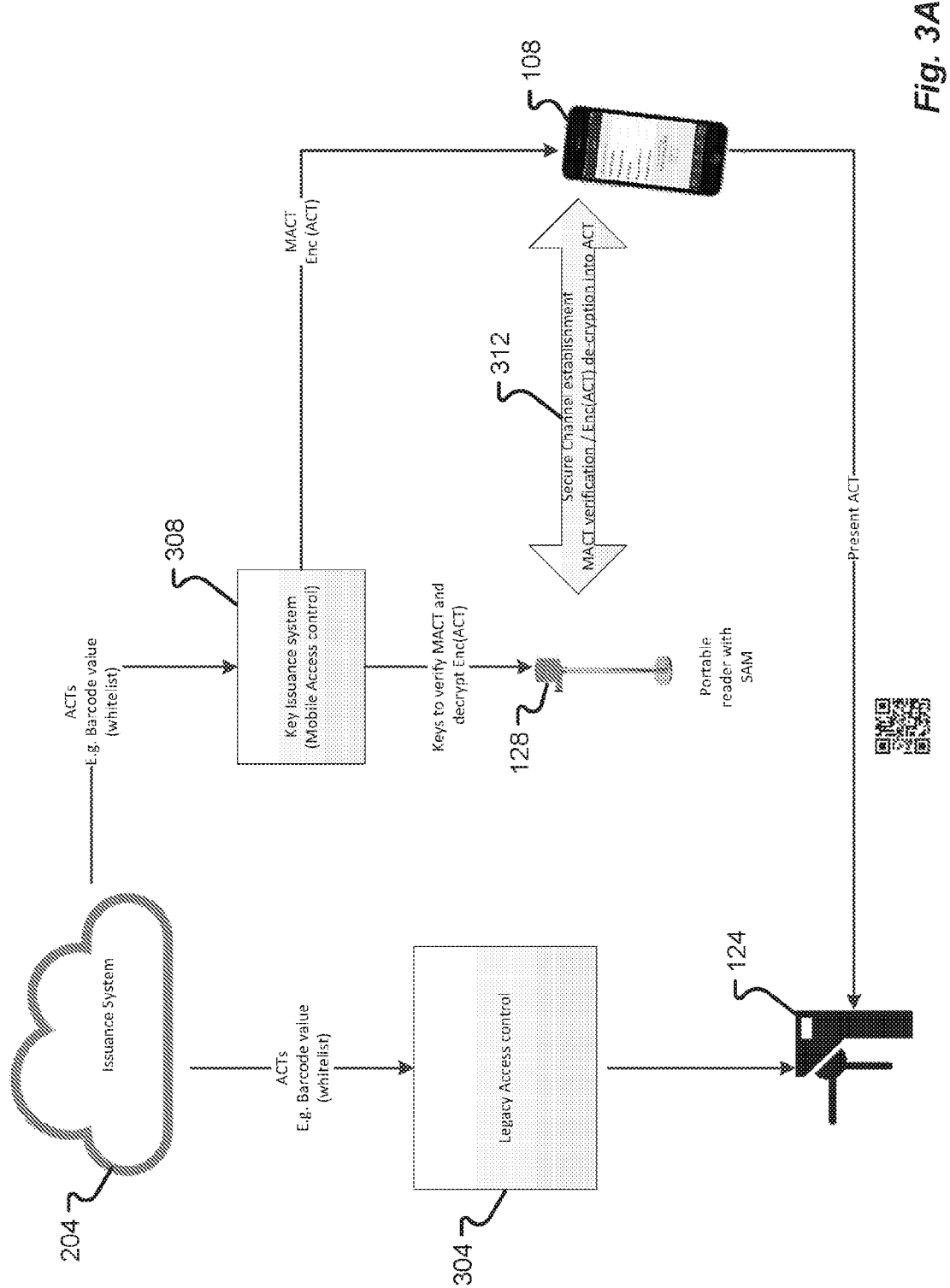
FIG. 3A is a first block diagram depicting components of an access control system in accordance with at least some embodiments of the present disclosure.
Figure 3B:
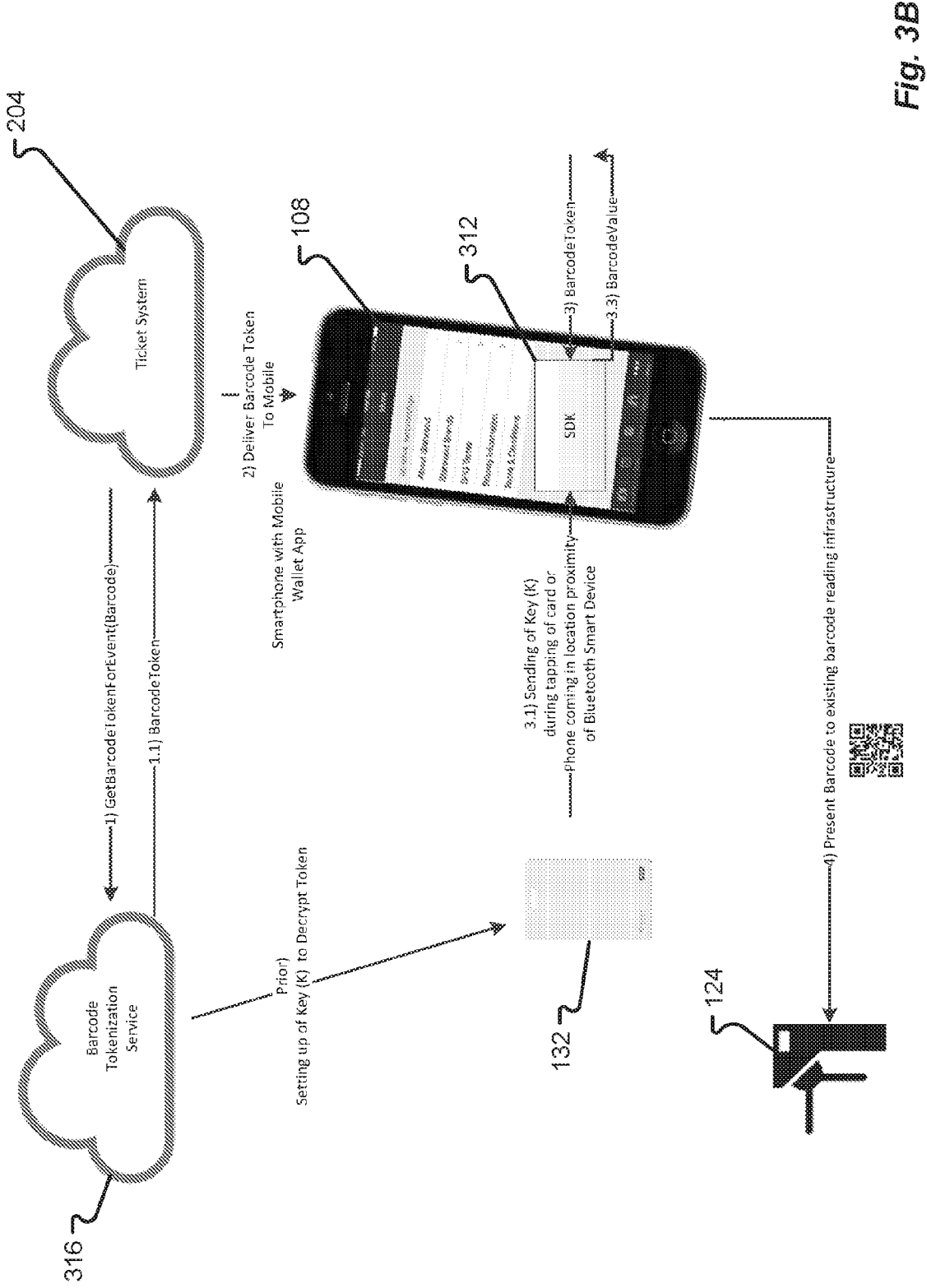
FIG. 3B is a second block diagram depicting components of an access control system in accordance with at least some embodiments of the present disclosure.

As described above, the access control system 100 contains components that effectively create a two-layered structure for protecting an asset 112. With reference now to FIGS. 3A and 3B, additional details of the components of an access control system 100 and the interactions between those components will be described in accordance with at least some embodiments of the present disclosure.

With reference initially to FIG. 3A, one possible configuration of system 100 components is shown to include the two types of readers 124, 128, both of which are configured to interact with a mobile communication device 108. The first reader(s) 124 are shown to have the ability to communicate with a larger legacy access control system 304 whereas the second reader(s) 128 are shown to have the ability to communicate with a key issuance system of a mobile access control system 308. In some embodiments, both the key issuance system 308 and legacy access control system 304 are configured to communicate with the cloud issuance system 204 to receive a listing of valid tokens. In some embodiments, both the legacy access control system 304 and key issuance system 308 receive tokens in a similar or identical format (e.g., as a whitelist of valid tokens, barcodes, QR codes, etc.). The legacy access control system 304 may simply utilize the tokens received from the cloud issuance system 204 in their native format whereas the key issuance system 308 may convert the tokens into other types of data formats or components of data objects. Thus, the single type of token issued by the cloud issuance system 204 may be split into different data structures by operation of the key issuance system 308.

In some embodiments, the inner system (legacy access control system 304 and readers 124) may be relatively simple (e.g., may run on simple barcodes or QR codes) and may utilize a whitelist approach. Thus, an issuance system 204 will issue barcode/QR code values that are transmitted to the legacy system 304 in the form of a whitelist.

Each barcode value issued by this legacy system 304 may represent an ACT in accordance with the present disclosure. Continuing this example, the barcode/QR code issuance system 204 (e.g., the ticketing system) will then interface to the key issuance system 308. It is the key issuance system 308 that can be configured to generate a MACT for each barcode/QR code value (e.g., ACT) and then send it to the mobile communication device 108. Readers 128 that are designed to process the MACT may represent a second access control system that is positioned around (e.g., as an outer perimeter 120 to) the inner 116 (legacy) system.

It should be appreciated that altogether these systems effectively create a single 'access control system' but as such one of the advantages proposed herein is effectively there is no need to interface the new mobile enabled access control system with the old one (e.g., the legacy system 304) as the integration happens effectively at the cloud issuance system 204 (e.g., the ticketing engine in most cases).

With reference now to FIG. 3B, another possible configuration of system 100 components will be described in accordance with at least some embodiments of the present disclosure. This particular configuration depicts the mobile communication device 108 interacting with the issuance system 204 and secure beacon 132. The system 100 also shows the ticket issuance system 204 and secure beacon 132 interacting with a barcode tokenization service 316, which may be executed with one or more servers in a cloud-computing environment or the like. Although functions of the tokenization service 316 will be described in connection with generating a barcode or similar type of optically encoded product, it should be appreciated that the tokenization service 316 may be configured to generate tokens in any type of form factor (not necessarily limited to optical codes) without departing from the scope of the present disclosure.

In some embodiments, the mobile communication device 108 is provided with an application or a specific Software Development Kit (SDK) 312 that facilitates the mobile communication device's 108 interactions with the system 204 and secure beacon 132. In some embodiments, the tokenization service 316 could be encapsulated in a server-side SDK component that is embedded in the issuance system 204.

In some embodiments, the tokenization service 316 may sit idle and wait for a tokenization request from the ticket system 204, which may be prompted when a user 104 purchases an admission ticket to a venue or event 112. Upon the user 104 placing such an order, the user 104 may further specify that a mobile communication device 108 will be used as a mechanism for entry/presentation of the token/barcode to a reader 124. This may effectively prompt the ticket system 204 to request a token for the event from the barcode tokenization service 316.

In response to receiving a request for a token/barcode, the barcode tokenization service 316 may respond with two different messages. First, the barcode tokenization service 316 may generate an appropriate barcode token and return that barcode token to the ticket system 204, which may ultimately deliver the barcode token to the mobile communication device 108. The barcode token received from the ticket service 204 may be stored in local memory of the mobile communication device 108 and may or may not necessarily need to be stored in a secure memory location, such as an encrypted mobile wallet. As a non-limiting example, the barcode token may be stored in a less-secure memory location of the mobile communication device 108 (e.g., in a ticket application or the like) because, at this point, the barcode token is not necessarily active or capable of allowing a user 104 admittance to an asset or venue 112, which means that the token is not of a type that requires additional security.

The barcode tokenization service 316 may further send one or more decryption keys K to a secure beacon 132. As discussed above, these one or more decryption keys K may be used to decrypt or unwrap the token at the mobile communication device 108. In some embodiments, the decryption keys K are stored in a secure area of memory in the secure beacon 132.

The secure beacon 132 maintains the decryption keys K until such time as the mobile communication device 108 is presented to the secure beacon 132 (e.g., brought within a read range of the secure beacon 132). In some embodiments, upon presentation to the secure beacon 132, the mobile communication device 108 and secure beacon 132 may establish a secure communication channel over which the secure beacon 132 can transmit the keys K to the mobile communication device 108.

The mobile communication device 108 may then use the application or the SKD 312 to apply the key(s) K, which will effectively unwrap or decrypt the barcode token received from the ticket system 204 into a useable barcode value/token. This unwrapped or unencrypted token can then be presented to the reader 124 to enable the mobile communication device 108 and its user 104 access to a protected asset 112.

Figure 4:
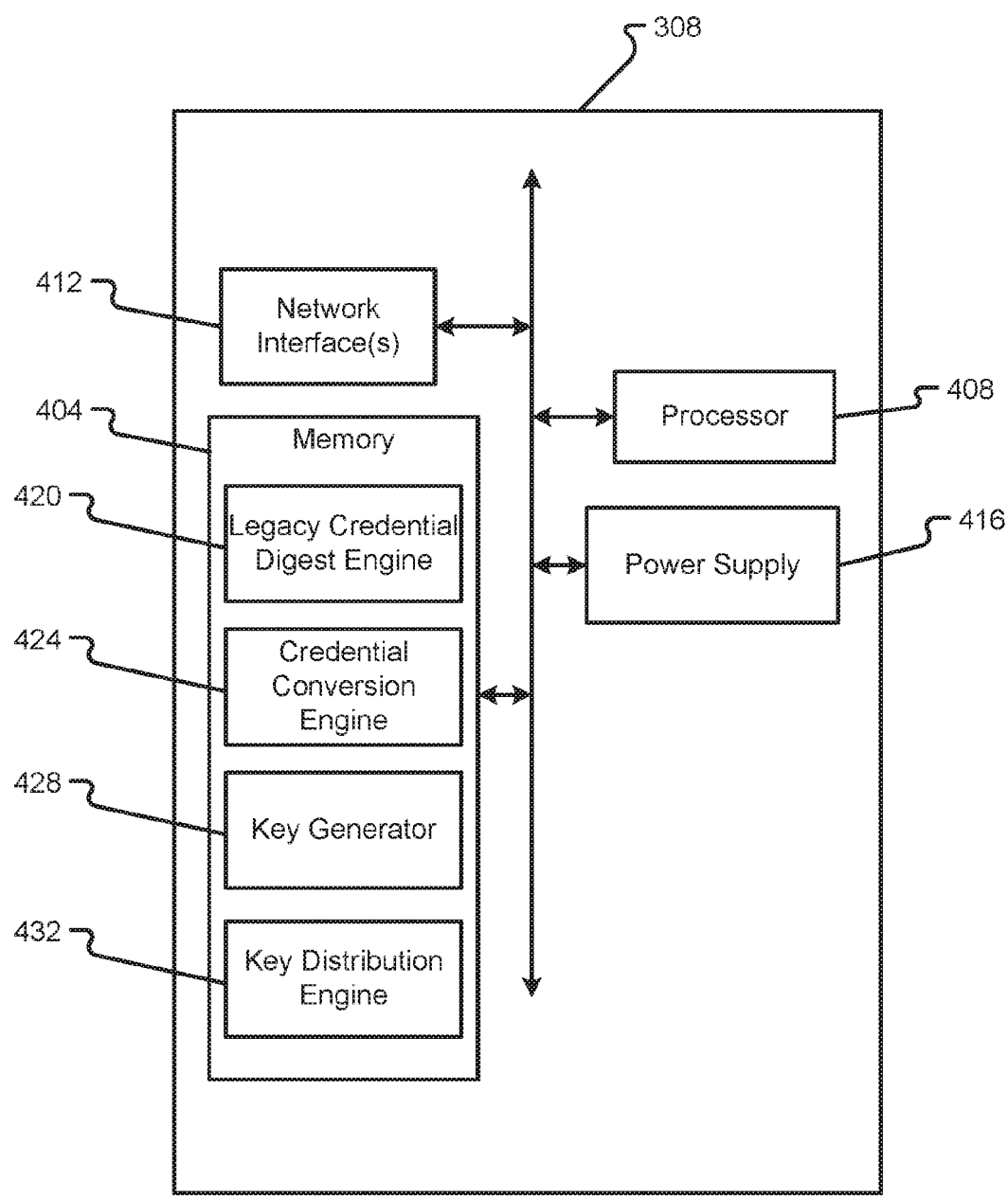
FIG. 4 is a block diagram depicting details of a key issuance system in accordance with at least some embodiments of the present disclosure.

With reference now to FIG. 4, additional details of a key issuance system 308 will be described in accordance with at least some embodiments of the present disclosure. The key issuance system 308 may be provided as one or multiple servers which are configured to communicate with other computing devices via a communication network or the like. In some embodiments, the servers operating the key issuance system 308 may be configured to communicate with both readers 128 and mobile communication devices 108. In some embodiments, both types of communications may occur over a communication network, but the same type of network does not necessarily need to be utilized for both types of communications. For instance, the key issuance system 308 may utilize a cellular or WiFi communication network to communicate with the mobile communication devices 108 whereas a wired communication network (e.g., Ethernet, RS-232, RS-485, etc.) may be used to load keys or the like onto the readers 128.

The key issuance system 308 is depicted to include computer memory 404, a processor 408, one or more network interfaces 412, and a power supply 416. The system 308 may further include user input and/or output devices. The key issuance system 308 may be provided as one or more servers capable of performing the features and functions described herein related to generating and issuing tokens for use by the mobile communication device 108 with other readers 124. The key issuance system 308 may be provided as part of a dedicated access control system or may service multiple different physical access control systems.

The processor 408 may include one or more CPUs, General Processing Units (GPUs), Integrated Circuit (IC) chips, microprocessors, etc. Alternatively or additionally, the processor 408 may include other hardware components that are capable of executing the instructions stored in memory 404.

The memory 404 can be configured to store processor-executable instructions in volatile or non-volatile memory devices. As non-limiting examples, the memory 404 may include volatile or non-volatile forms of memory devices. For instance, the memory 404 may include flash memory, ROM, RAM, hardware security modules, SAMs, Secure Elements (SEs), etc. The types of instructions that may be stored in memory 404 include, without limitation, a legacy credential digest engine 420, a credential conversion engine 424, a key generator 428, and a key distribution engine 432.

The instructions represented by the legacy credential digest engine 420 may enable the processor 408 to receive one or more tokens from the cloud issuance system 204 and extract the necessary data therefrom. For instance, the legacy credential digest engine 420 may enable the key issuance system 308 to receive and understand the content of the tokens received from the cloud issuance system 204 and, in some embodiments, decode the token into its constituent parts (e.g., into the information represented by the token/code).

The instructions represented by the credential conversion engine 424 may enable the processor 408 to convert the content of the token received from the cloud issuance system 204 into a new or different format of token. For instance, the credential conversion engine 424 may enable the processor 408 to generate a secure data object or components thereof for distribution to a mobile communication device 108 and/or reader 128.

The instructions represented by the key generator 428 may enable the processor 408 to generate one or more keys or ephemeral key pairs for utilization in connection with securing a data object and/or for distributing to a mobile communication device 108. As discussed above, the key issuance system 308 may be configured to generate one or more keys K, mobileKeys mK, and/or ephemeral key pairs. This functionality may be facilitated by executing the instructions of the key generator 428.

The instructions represented by the key distribution engine 432 may enable the processor 408 to work in cooperation with the network interface(s) 412 to distribute keys and/or secure data objects to the mobile communication device 108 and/or reader 128. For instance, the key distribution engine 432 may enable the key issuance system 308 to prepare one or more message/data packages for delivery to the mobile communication device 108 and/or reader 128. Alternatively or additionally, the key distribution engine 432 may also enable the key distribution engine 308 to establish a secure communication channel with a mobile communication device 108 and/or reader 128 as well as perform various authentication protocols as part of creating the secure communication channel.

The network interface(s) 412 may correspond to one or more hardware devices that connect the system 308 to a communication network. For instance, the network interface(s) 412 may include one or more wired or wireless serial or parallel data ports. As a more specific example, the network interface(s) 412 may include an Ethernet port, a SCSI port, or the like. The network interface(s) 312 may also include drivers for the hardware components thereof. Alternatively or additionally, the network interfaces 412 may also include antennas and/or drivers that facilitate wireless communications with other devices.

The power supply 416 may correspond to internal and/or external power supply devices. For instance, the power supply 416 may correspond to a battery pack, capacitive charge device, or the like. Alternatively or additionally, the power supply 416 may correspond to a power adapter that enables the system 308 to receive AC power from an external outlet and convert that AC power into DC power or useable power for the components of the system 308.

Figure 5:
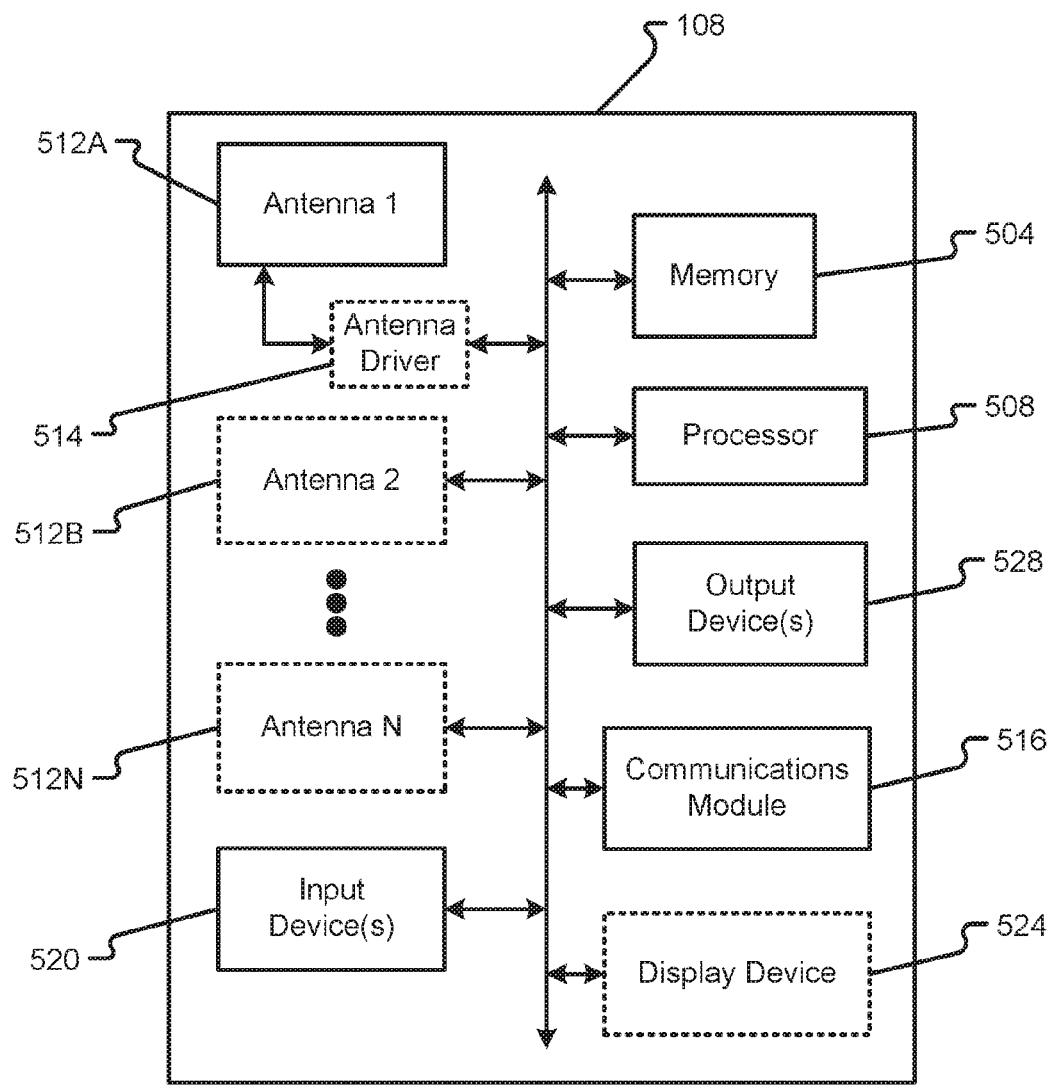
FIG. 5 is a block diagram depicting details of a mobile communication device in accordance with at least some embodiments of the present disclosure.

With reference now to FIG. 5, additional details of a mobile communication device 108 will be described in accordance with at least some embodiments of the present disclosure.

The mobile communication device 108 may be configured to communicate with readers 124, 128, the secure beacons 132, the key issuance system 308, and the cloud issuance system 204 via one or more wired or wireless communication connections. With respect to reader communications, these one or more wireless communication connections can include communications via at least one of conventional radio protocols, proximity-based wireless communication protocols, Bluetooth™, BLE, infrared, audible, NFC, RF, inductive coupling, and other wireless communication networks and/or protocols. In some cases, communications between the mobile communication device 108 and the readers 124, 128 may be established automatically when the mobile communication device 108 enters an active zone of a reader 124, 128. Alternatively or additionally, communication between the mobile communication device 108 and a reader (e.g., reader 124) may be facilitated by the mobile communication device 108 rendering a visual code on its display device 524 and then the reader 124 observing that visual code with some form of machine vision. In one embodiment, the active zone of a reader 124, 128 and/or secure beacon 132 may be defined as a three-dimensional space where the intensity of RF signals emitted by the reader 124, 128 and/or secure beacon 132 exceeds a threshold of sensitivity of the mobile communication device 108 and the intensity of RF signals emitted by the mobile communication device 108 exceeds a threshold of sensitivity of the reader/secure beacon.

Alternatively or additionally, the mobile communication device 108 may operate as the interrogating device and the reader and/or secure beacon may respond to interrogation signals emitted by the mobile communication device 108.

In some embodiments, the mobile communication device 108 may be configured to communicate across a communication network or a collection of communication networks. The communication network used by the mobile communication device 108 can include communication via at least one of conventional radio networks, wireless communication networks, Zig-Bee, GSM, CDMA, WiFi, and/or using other communication networks and/or protocols as provided herein.

The mobile communication device 108 may include one or more components, such as, a memory 504, a processor 508, an antenna 512-N, a communications module 516, one or more input devices 520, and one or more display devices 524. In some embodiments, the mobile communication device 108 may further include a power module.

The memory 504 of the mobile communication device 108 may be used in connection with the execution of application programming or instructions by the processor 508, and for the temporary or long term storage of program instructions and/or data. The memory 504 may contain executable functions that are used by the processor 508 to run other components of the mobile communication device 108. In one embodiment, the memory 504 may be configured to securely store tokens and other secure data objects. For instance, the information that may be stored by the mobile communication device 108 may include, but is not limited to, unique identifications, manufacturer identification, passwords, keys, encryption schemes, transmission protocols, and the like. In some embodiments, the memory 504 may be configured to store configuration information, identification information, authentication information, and/or the like. In some embodiments, the memory 504 may comprise volatile or non-volatile memory and a controller for the same. Non-limiting examples of memory 504 that may be utilized in the mobile communication device 108 include RAM, ROM, buffer memory, flash memory, solid-state memory, or variants thereof. Although not depicted, the memory 504 may contain various applications for use by the user 104. Examples of such applications include, without limitation, an Operating System (O/S), a mobile wallet application, and/or a mobile ticketing application that has one or more Application Programing Interfaces (APIs) that facilitate interactions with the key issuance system 308 and/or cloud issuance system 204. These various instructions and applications may be executed by the processor 508.

The processor 508 may correspond to one or many microprocessors that are contained within the housing of the mobile communication device 108 with the memory 504. In some embodiments, the processor 508 incorporates the functions of the user device's Central Processing Unit (CPU) on a single Integrated Circuit (IC) or a few IC chips. The processor 508 may be a multipurpose, programmable device that accepts digital data as input, processes the digital data according to instructions stored in its internal memory, and provides results as output. The processor 508 implements sequential digital logic as it has internal memory. As with most known microprocessors, the processor 508 may operate on numbers and symbols represented in the binary numeral system.

The one or more antennas 512*a*-N may be configured to enable wireless communications between the mobile communication device 108 and other computing devices (e.g., a reader 124, 128, a secure beacon 132, the key issuance system 308, and/or the cloud issuance system 204). As can be appreciated, the antenna(s) 512*a*-N may be arranged to operate using one or more wireless communication protocols and operating frequencies including, but not limited to, Bluetooth®, NFC, Zig-Bee, GSM, CDMA, WiFi, RF, and the like. By way of example, the antenna(s) 512*a*-N may be RF antenna(s), and as such, may transmit RF signals through free-space to be received by a reader having an RF transceiver. One or more of the antennas 512*a*-N may be driven or operated by a dedicated antenna driver 514. Alternatively or additionally, one or more of the antennas 512*a*-N may be configured to receive RF signals transmitted by other devices across free-space. The antennas 512*a*-N and/or drivers 514 associated therewith may contain the appropriate circuitry to receive, decode, and amplify the received signals for consumption by the processor 508.

In some embodiments, the mobile communication device 108 may include a power module. The power module may be configured to provide power to the parts of the mobile communication device 108 in order to operate. The power module may store power in a capacitor of the power module. In one embodiment, electronics in the power module may store energy in the capacitor and turn off when an RF field is present. This arrangement can ensure that energy is presented to the mobile communication device 108 minimizing any effect on read distance. Although the mobile communication device 108 may be configured to receive power passively from an electrical field of a reader, it should be appreciated that the mobile communication device 108 may provide its own power. For example, the power module may include a battery or other power source to supply power to parts of the mobile communication device 108. The power module may include a built-in power supply (e.g., battery) and/or a power converter that facilitates the conversion of externally-supplied AC power into DC power that is used to power the various components of the mobile communication device 108. In some embodiments, the power module may also include some implementation of surge protection circuitry to protect the components of the mobile communication device 108 from power surges.

The mobile communication device 108 may include a communications module 516 that is configured to communicate with one or more different systems or devices either remotely or locally to the mobile communication device 108. Thus, the communications module 516 can send or receive messages to or from readers 124, 128, secure beacons 132, the key issuance system 308, the cloud issuance system 204, access control systems, or other systems and/or devices. In some embodiments, the communicated information may be provided to, or exchanged with, other components within the mobile communication device 108.

The input device(s) 520 may include at least one device sensor. Among other things, a device sensor may be configured to detect a state of the mobile communication device 108 or location of the mobile communication device 108. Illustrative but non-limiting sensors include one or more biometric sensors (e.g., heart rate, body temperature and/or heat signature, blood pressure, etc.), capacitive sensors, light sensors, image sensors, temperature sensors, pressure sensors, contact sensors, magnetic sensors, radio indoor positioning sensors, location services sensors and/or devices, combinations thereof, and the like. As can be appreciated, one or more of these sensors may alternatively or additionally be incorporated into a wearable device.

In some embodiments, the mobile communication device 108 may include a user interface, a reader interface, and/or a network interface. The user interface may or may not include one or more input devices 520, display devices 524, and/or output devices 528.

Examples of suitable user input devices 520 that may be included in the user interface include, without limitation, buttons, keyboards, mouse, touch-sensitive surfaces, pen, camera, microphone, etc. Examples of suitable user output devices 528 that may be included in the user interface include, without limitation, display screens, touchscreens, lights, speakers, etc. It should be appreciated that the user interface may also include a combined user input and user output device, such as a touch-sensitive display or the like.

In some embodiments, one or more antennas 512*a*-N may be specifically-configured for communicating via a particular protocol that can facilitate communications with a reader. Such an antenna and/or driver may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface is specifically provided to facilitate proximity-based communications with a credential via communication channel or multiple communication channels. A network interface, on the other hand, may comprise hardware that facilitates communications with other communication devices over the communication network. The network interface may include an Ethernet port, a Wi-Fi card, a Network Interface Card (NIC), a cellular interface (e.g., antenna, filters, and associated circuitry), or the like. The network interface may be configured to facilitate a connection between the mobile communication device 108 and a communication network and may further be configured to encode and decode communications (e.g., packets) according to a protocol utilized by the communication network.

If NFC is being used for the communication channel, then the reader 124, 128 and/or secure beacon 132 and mobile communication device 108 may have their interfaces/antennas inductively coupled to one another at which point the two devices will authenticate or mutually authenticate with one another. Following authentication, the reader and/or secure beacon may request a key or multiple keys from the mobile communication device 108, or the mobile communication device 108 may offer a key or multiple keys to the reader/secure beacon. Upon receiving the key(s) from the mobile communication device 108, the reader/secure beacon may analyze the key(s) and determine if the key(s) are valid and, if so, allow the holder/user of the mobile communication device 108 access to exchange further information. It should be appreciated that the mobile communication device 108 may alternatively or additionally be configured to analyze information received from the reader/secure beacon.

If, for instance, BLE or some other non-inductive protocol (e.g., Wi-Fi) is being used for the communication channel, then the reader/secure beacon and mobile communication device 108 may perform a discovery routine prior to pairing with one another or otherwise connecting to establish the communication channel. After the channel is established, however, the reader/secure beacon and mobile communication device 108 may then authenticate one another and exchange relevant information, such as the key(s), to enable further sharing of sensitive information (e.g., keys K, mobileKeys mK, and/or secure data objects).

Figure 6:
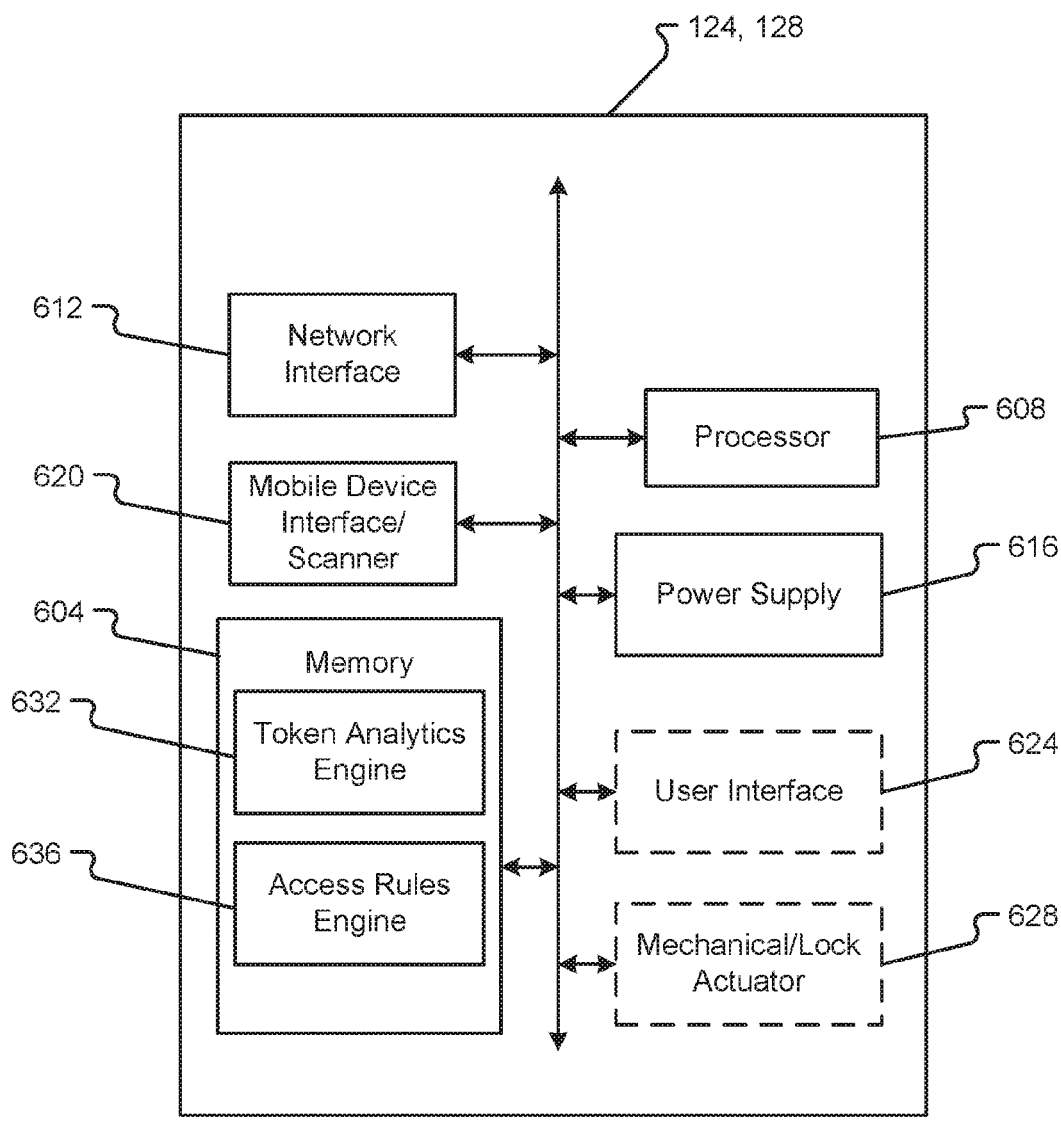
FIG. 6 is a block diagram depicting details of a reader in accordance with at least some embodiments of the present disclosure.

With reference now to FIG. 6, additional details of a reader 124, 128 will be described in accordance with at least some embodiments of the present disclosure. It should be appreciated that while some components of functions of reader 124 may differ from reader 128, the basic components of a reader 124, 128 may be similar. As discussed above, some readers 124 may be configured to read tokens in a first format (e.g., as optical codes, barcodes, QR codes, etc.), whereas the other readers 128 may be configured to read and/or share information with the mobile communication device 108 using tokens or components thereof in a different format. Furthermore, the functionality of the reader 124 may be at least partially associated with protecting an asset 112 whereas the functionality of the reader 128 may be at least partially associated with enabling a mobile communication device 108 to have access to or deliver an appropriate token to the other reader 124.

In some embodiments, a reader may include memory 604, a processor 608, a network interface 612, a power supply 616, a mobile device interface or scanner 620, an optional user interface 624, and an optional mechanical/lock actuator 628. These components may be maintained in a single device housing or may be distributed among a number of different physical devices that are interconnected with one another via wires and/or peripheral interconnect devices.

The memory 604 may be similar or identical to other memory devices depicted and described herein. For instance, the memory 604 may include volatile and/or non-volatile memory devices configured to store instructions and other routines for execution by the processor 608. The memory 604 may further include a secure data storage device or area for storing sensitive information, whitelists, and other tokens received from the cloud issuance system 204 via the legacy access control system 304.

The memory 604 is further shown to include instructions in the form of a token analytics engine 632 and an access rules engine 636. In some embodiments, these instruction sets may only be provided on the readers 124, which control the access to the asset(s) 112. The token analytics engine 632 may enable the processor 608 to consume one or more tokens from a mobile communication device 108 and then extract the information from the token(s) for analysis in connection with determining whether a user 104 is granted access to the asset 112 or not. The token analytics engine 632 may further work in cooperation with the access rules engine 636 that overlays general access control rules for the legacy access control system 304. For instance, a user 104 may have a valid token for some readers 124 and some portals but not other readers 124 and other portals. The token analytics engine 632 may simply determine whether the token is a valid token, but the access rules engine 636 may decide whether the user's token grants them access to a particular portal protected by a particular reader 124. The access rules engine 636 may also include time restrictions on access and/or other rules related to securing the asset(s) 112 (e.g., whether two-man rules are needed, whether an escort is needed for access, whether the user 104 can re-use a token, whether re-entry is permitted, etc.).

The processor 608 may be similar or identical to other processors depicted and described herein. As a non-limiting example, the processor 608 may include a microprocessor, an IC chip, a collection of microprocessors, a collection of IC chips, an ASIC, or combinations thereof. In some embodiments, the processor 608 may be configured to optimally execute instructions stored in memory in the form of firmware.

The network interface 612 may facilitate connectivity between the reader and other communication devices. For instance, the network interface 612 may provide connectivity between a reader 124 and the legacy access control system 304. In some embodiments, the network interface 612 may include an Ethernet interface, an RS-232 interface, an RS-485 interface, a BLE interface, or any other type of wired or wireless communication interface along with the necessary circuitry/drivers to support the physical interface. This network interface 612 may be optional in some embodiments, in which case the reader may need to be remotely provisioned and periodically updated with a portable reader update device carried by security personnel or the like. Such readers are generally referred to as stand-alone or non-networked readers. In fact, some examples of readers 128 may be provided with this type of configuration without departing form the scope of the present disclosure.

The mobile device interface 620 may provide the reader with the ability to interface with a mobile communication device 108 and/or consume a token therefrom. In some embodiments, the mobile device interface 620 may include one or more wireless communication interfaces that couple with a similar type of interface in the mobile communication device 108. Alternatively or additionally, the interface 620 may include an optical scanner or similar type of machine vision device that enables the reader to read or scan an optical code presented by a mobile communication device 108. It should be appreciated that a reader may be provided with one or multiple different types of mobile device interfaces without departing from the scope of the present disclosure.

The power supply 616 may be similar or identical to other power supplies depicted and described herein. For instance, the power supply 616 may include an internal power supply, such as a battery or the like. Alternatively or additionally, the power supply 616 may include one or more power conditions that enable the reader to receive power from an external power outlet.

The user interface 624 of a reader may correspond to an optional component and may include a simple type of interface. For instance, the user interface 624 may include one or more user input devices, such as buttons or keys, and one or more user output devices, such as speakers, LEDs, display screens, etc. While the user interface 624 may be similar or identical to other user interfaces depicted and described herein, it should be appreciated that the user interface 624 may not include as rich a functionality offering as other interfaces provided by other devices.

The mechanical component or lock actuator 628 may correspond to another optional device. In some embodiments, the reader analysis components may be coupled with a device or lock that restricts physical access to an asset until such time as a valid token is received and verified by the reader. In some embodiments, the reader may be configured with one or more components that release, unlock, or otherwise open a portal through a barrier to allow access to an asset. Non-limiting examples of a mechanical component or lock actuator include a turnstile with a releasable lock mechanism, a cylindrical lock mechanism, a latch or bolt lock mechanism, or combinations thereof.

Figure 7:
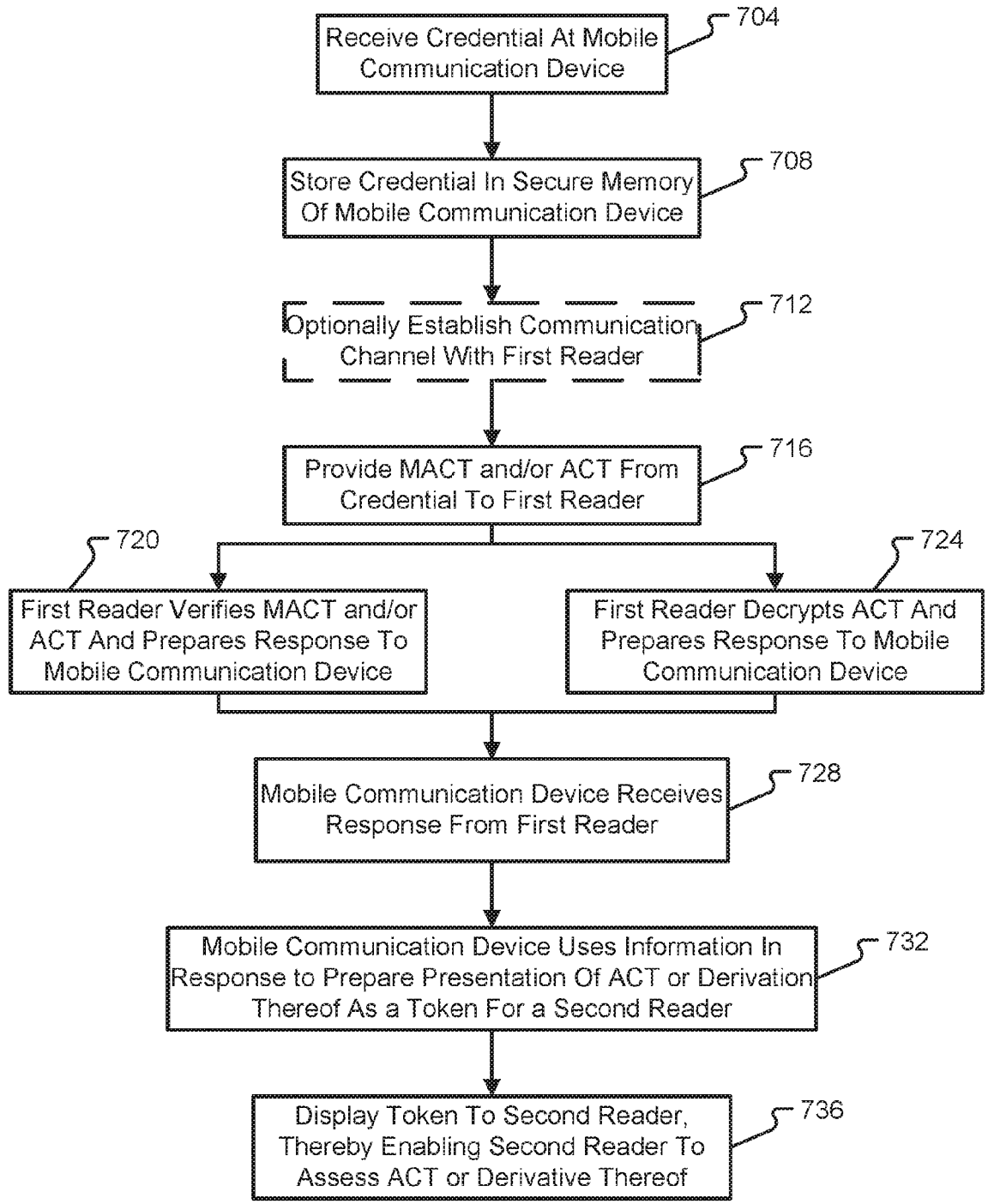
FIG. 7 is a flow diagram depicting a first authentication method in accordance with at least some embodiments of the present disclosure.

With reference now to FIG. 7, additional details of a method of operating an access control system will be described in accordance with at least some embodiments of the present disclosure. The method begins when a credential or the like is received at the mobile communication device 108 (step 704). In some embodiments, the credential transmitted to the mobile communication device may include the MACT, the ACT, or an encrypted ACT e(ACT) and an optional public key of an ephemeral key-pair. The received credential or components thereof may then be stored in a secure memory area of the mobile communication device (step 708).

The method continues with the mobile communication 108 device optionally establishing a secure communication channel with a reader (e.g., reader 128) (step 712). Thereafter, the mobile communication device 108 may provide the reader with the MACT and/or ACT (step 716). In some embodiments, the reader 128 may verify the MACT and/or ACT and prepare an appropriate response for the mobile communication device (step 720). In some embodiments, the reader may decrypt the ACT and prepare an appropriate response for the mobile communication device 108 (step 724). Said another way, the reader may be configured to actually perform a verification of the MACT and/or ACT or the reader may not actually perform a verification, but rather may only decrypt the ACT.

Thereafter, the mobile communication device 108 receives the response from the reader (step 728). In some embodiments, the response may be received over the same communication channel that was used to provide the MACT and/or ACT to the reader. In other embodiments, a different communication channel may be used to provide the response back to the mobile communication device 108.

The method then continues with the mobile communication device 108 using the information received from the reader to prepare a presentation of the ACT or a derivation thereof as a token for another reader (e.g., reader 124) (step 732). In some embodiments, a token is displayed to the next reader by the mobile communication device 108. It should be appreciated that the mobile communication device 108 may be using a new or completely different communication channel than the one that was established with the reader that provided the response in steps 720, 724, 728 (step 736). Said another way, the mobile communication device may establish a different communication channel and/or utilize a totally different communication protocol with the next reader as compared to the channel/protocol used with the original reader.

Figure 8:
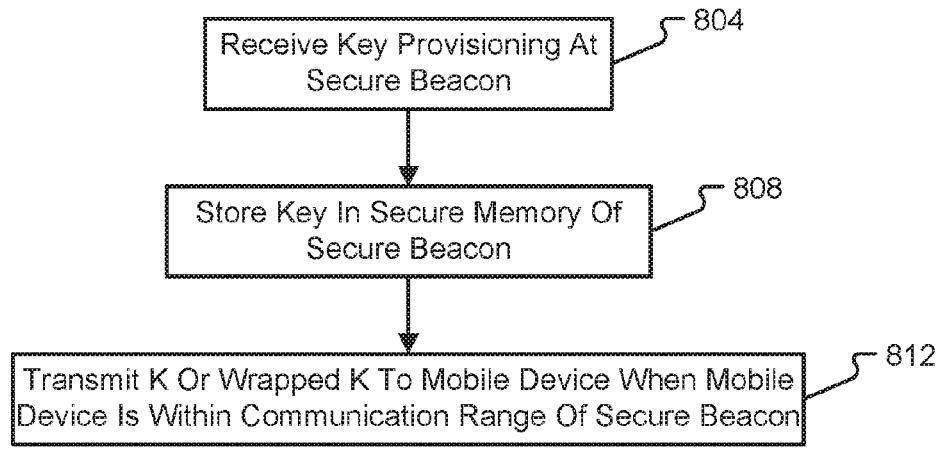
FIG. 8 is a flow diagram depicting a method of delivering a key to a mobile communication device from a secure beacon in accordance with at least some embodiments of the present disclosure.
Figure 9:
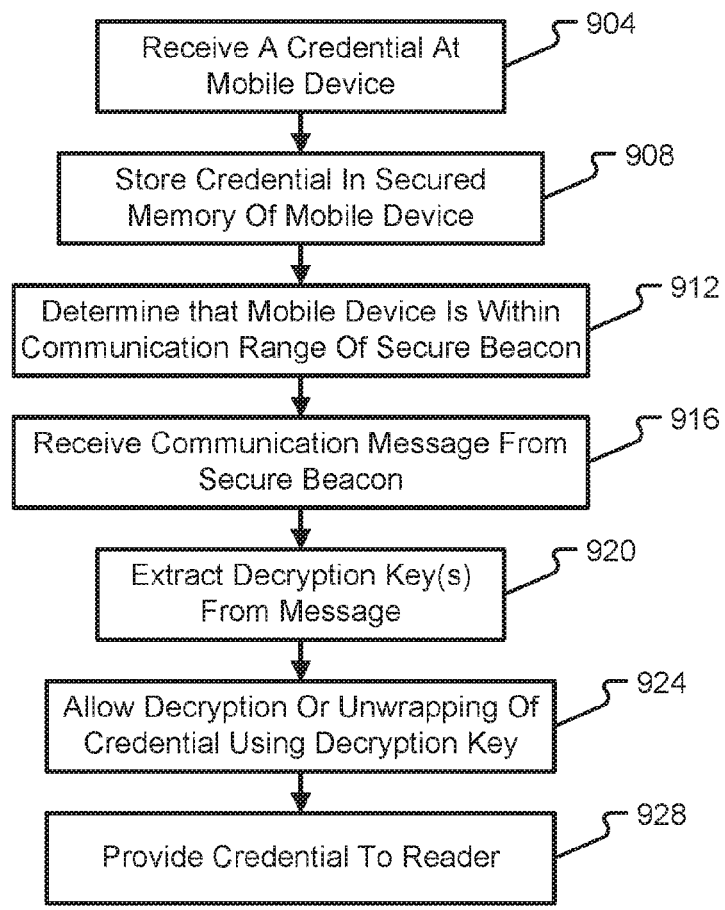
FIG. 9 is a flow diagram depicting a second authentication method in accordance with at least some embodiments of the present disclosure.

With reference now to FIGS. 8 and 9, an alternative method of operating an access control system will be described in accordance with at least some embodiments of the present disclosure. The method of FIG. 8 begins when a key or set of keys is/are provisioned onto a secure beacon 132 (step 804). This provisioning may occur during the manufacture of the secure beacon 132 or it may be performed during or after the secure beacon 132 has been installed at a predetermined location relative to an asset 112.

During provisioning, the key(s) received at the secure beacon 132 are stored in secure memory (step 808). As a non-limiting example, the key(s) may be stored in an encrypted form and/or may be maintained in a secure data storage device that is protected with encryption and other physical mechanisms.

The secure beacon 132 may then maintain the key(s) in a protected state until a predetermined time/date occurs and/or until a mobile communication device 108 is brought within a communication range of the secure beacon 132. Once the mobile communication device 108 is brought within the communication range and an appropriate pairing/authentication process has been performed, the method may continue with the secure beacon 132 transmitting the key K or a wrapped key K to the mobile communication device 108 (step 812).

With reference now to FIG. 9, details of the method followed by the mobile communication device 108. The method begins when a credential is received at the mobile communication device 108 (step 904). The credential may correspond to a token ACT that is wrapped, encrypted, or otherwise protected by information that can only be obtained from a validly provisioned secure beacon 132.

The mobile communication device 108 will store the credential in secure memory (step 908) and wait until it is brought within a communication range of a secure beacon 132 (step 912). When the mobile communication device 108 comes within a communication range of the secure beacon 132, the method continues with the mobile communication device 108 establishing a secure communication channel with the secure beacon 132 and then receiving one or more messages from the secure beacon 132 (step 916). In some embodiments, the messages received by the mobile communication device 108 may include one or more keys K as illustrated in step 812 of FIG. 8.

The method will then continue with the mobile communication device 108 extracting the decryption key(s) from the message(s) (step 920). Once extracted, the mobile communication device 108 can utilize the key(s) to decrypt or otherwise unwarp the credential that was previously received from the issuance system (step 924). At this point the mobile communication device 108 may be considered to have possession of a token (e.g., an unencrypted ACT) that can be provided to a reader that is positioned at an inner perimeter 116 of the access control system 100 (step 928). The reader can then analyze the token and determine if the user 104 of the mobile communication device 108 is permitted access to the protected asset 112.

As can be appreciated, a number of advantages can be realized by leveraging embodiments of the present disclosure. As one non-limiting example, the access control token (ACT) to open the existing inner perimeter access control system can be end-to-end encrypted between the cloud issuance system and the SAM of the outer perimeter readers 128.

This allows the security of the wallet application on a mobile communication device 108 to be less security sensitive as an extraction of the data will not yield any value that can be rendered in a two-dimensional barcode/QR code to gain access to the asset 112.

Furthermore, the ACT to render the barcode is only revealed in clear after successful verification of other access control tokens (e.g. after a token exchange). In some embodiments, this happens for each individual mobile communication device 108 after successful verification at the outer perimeter 120 leaving an attacker or fan very little time to copy or duplicate the barcode.

The ACT may not need to be revealed or transmitted to a non-authorized reader (e.g., mutual authentication of reader to mobile wallet may be required to release the encrypted ACT ENC_ACT). Further still, the existing access control system is not affected or in need of costly system-based upgrades to facilitate this heightened security.

In some embodiments, the token exchange and verification can happen locally using peer-to-peer proximity network technologies completely offline from the internet (both from the perimeter reader side and from the user's side) and hence not requiring Internet connectivity on the user's mobile communication device 108.

In case of the secure beacon 132 implementation, the ACT can be maintained in the secure wallet and encrypted until the mobile communication device 108 comes into proximity with the secure beacon 132, thereby preventing the ACT from being shared or copied until the day of an event or some other defined time period.

Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

What is claimed is:

1. A system comprising:
a wireless communication device configured to be positioned at or near an outer perimeter; the outer perimeter containing an inner perimeter, the wireless communication device storing a decryption key and configured for transmitting the decryption key to a mobile communication device within communication proximity of the wireless communication device, the decryption key permitting the mobile communication device to decrypt an encrypted data object issued to the mobile communication device to obtain an unencrypted access control token, ACT, or a credential derived from the ACT, enabling the mobile communication device to present the ACT or the credential derived from the ACT to a reader positioned at or near the inner perimeter and configured to assess a validity of the ACT or the credential derived from the ACT based on the presentation of the ACT or the credential derived from the ACT by the mobile communication device.

2. The system of claim 1, comprising the outer perimeter, the inner perimeter, and the reader.

3. The system of claim 2, wherein the reader utilizes machine vision to read the ACT or the credential derived from the ACT.

4. The system of claim 2, wherein the inner perimeter is aligned with the outer perimeter.

5. The system of claim 1, further comprising a key issuance system configured to generate and provide the ACT to the mobile communication device via the encrypted data object and to issue the decryption key to the wireless communication device.

6. The system of claim 1, wherein a wireless communication protocol for wirelessly transmitting the decryption key from the wireless communication device to the mobile communication device comprises at least one of an MD communication protocol, NFC, Bluetooth, BLE, or a proximity-based communication protocol.

7. The system of claim 1, wherein the presentation of the ACT or the credential derived from the ACT is in an optical, computer-readable format.

8. The system of claim 7, wherein the optical, computer-readable format comprises at least one of a barcode, a two-dimensional code, or an image.

9. The system of claim 1, wherein the wireless communication device is configured for periodically transmitting the decryption key.

10. The system of claim 1, wherein the encrypted data object is unusable with the reader for granting access to within the inner perimeter to the mobile communication device.

11. The system of claim 1, wherein before transmitting the decryption key to the mobile communication device, the wireless communication device is configured to wrap or encrypt the decryption key using an additional key, InK, which has been provisioned to the mobile communication device.

12. A method comprising:
receiving, at a wireless communication device positioned at or near an outer perimeter, a decryption key from a key issuance system, wherein the outer perimeter contains an inner perimeter;
storing the decryption key at the wireless communication device;
transmitting the decryption key from the wireless communication device to a mobile communication device within communication proximity of the wireless communication device, the decryption key permitting the mobile communication device to decrypt an encrypted data object issued to the mobile communication device from the key issuance system to obtain an unencrypted access control token, ACT, or a credential derived from the ACT, enabling the mobile communication device to present the ACT or the credential derived from the ACT to a reader positioned at or near the inner perimeter that is configured to assess a validity of the ACT or the credential derived from the ACT based on the presentation of the ACT or the credential derived from the ACT by the mobile communication device.

13. The method of claim 12, further comprising:
receiving a presentation by the mobile communication device of the ACT or the credential derived from the ACT at the reader; and assessing a validity of the ACT or the credential derived from the ACT.

14. A non-transitory computer-readable storage medium comprising instructions, that when executed by one or more processors, cause the one or more processors to:

store a decryption key at a wireless communication device positioned at or near an outer perimeter; and transmit the decryption key from the wireless communication device to a mobile communication device within communication proximity of the wireless communication device, the decryption key permitting the mobile communication device to decrypt an encrypted data object issued to the mobile communication device to obtain an unencrypted access control token, ACT, or a credential derived from the ACT, enabling the mobile communication device to present the ACT or the credential derived from the ACT to a reader positioned at or near an inner perimeter contained by the outer perimeter, the reader configured to assess a validity of the ACT or the credential derived from the ACT based on the presentation of the ACT or the credential derived from the ACT by the mobile communication device.

15. The non-transitory computer-readable storage medium of claim 14, wherein the instructions, when executed by the one or more processors, further cause the one or more processors to:

generate the ACT based on an access control credential;

transmit the encrypted data object to the mobile communication device, wherein the encrypted data object comprises the ACT;

generate the decryption key; and transmit the decryption key to the wireless communication device for storage thereby and eventual distribution to the mobile communication device.

16. The non-transitory computer-readable storage medium of claim 14, wherein the instructions, when executed by the one or more processors, further cause the one or more processors to:

receive the encrypted data object at the mobile communication device;

receive the decryption key at the mobile communication device;

decrypt the encrypted data object at the mobile communication device using the decryption key to obtain the ACT or the credential derived from the ACT; and enable the mobile communication device to present the ACT or the credential derived from the ACT to the reader.

17. The non-transitory computer-readable storage medium of claim 16, wherein enabling the mobile communication device to present the ACT or the credential derived from the ACT to the reader comprises providing the ACT in an optical, computer-readable format.

18. The non-transitory computer-readable storage medium of claim 14, wherein the instructions, when executed by the one or more processors, further cause the one or more processors to periodically transmit the decryption key from the wireless communication device.

19. The non-transitory computer-readable storage medium of claim 14, wherein the encrypted data object is unusable with the reader for granting access to within the inner perimeter to the mobile communication device.

20. The non-transitory computer-readable storage medium of claim 14, wherein the instructions, when executed by the one or more processors, further cause the one or more processors to, before transmitting the decryption key from the wireless communication device to the mobile communication device, wrap or encrypt the decryption key using an additional key, mK, which has been provisioned to the mobile communication device.

* * * * *